(12) United States Patent
Kubo et al.

(10) Patent No.: US 9,798,213 B2
(45) Date of Patent: Oct. 24, 2017

(54) ELECTROCHROMIC ELEMENT, METHOD OF DRIVING THE SAME, AN OPTICAL FILTER, LENS UNIT, IMAGE PICK-UP DEVICE AND WINDOW MATERIAL

(71) Applicant: CANON KABUSHIKI KAISHA, Tokyo (JP)

(72) Inventors: Wataru Kubo, Inagi (JP); Kazuya Miyazaki, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/170,091

(22) Filed: Jun. 1, 2016

(65) Prior Publication Data

US 2016/0357082 A1    Dec. 8, 2016

(30) Foreign Application Priority Data

Jun. 3, 2015 (JP) ................... 2015-112778
May 26, 2016 (JP) ................... 2016-104873

(51) Int. Cl.
  *G02F 1/155*    (2006.01)
  *G02F 1/163*    (2006.01)
  *G02F 1/15*     (2006.01)

(52) U.S. Cl.
  CPC ............ *G02F 1/155* (2013.01); *G02F 1/1521* (2013.01); *G02F 1/163* (2013.01)

(58) Field of Classification Search
  CPC ............. H01L 51/5212; H01L 51/5215; H01L 31/022466; H01L 51/445; H05K 1/0274; Y02P 70/521; Y02E 10/549
  USPC ................. 359/265–275, 900; 345/105
  See application file for complete search history.

(56) References Cited

U.S. PATENT DOCUMENTS

| | | | |
|---|---|---|---|
| 5,446,577 A * | 8/1995 | Bennett .............. | G02F 1/155 359/267 |
| 6,188,505 B1 | 2/2001 | Lomprey et al. | |
| 8,120,245 B2 * | 2/2012 | Reynolds ............ | G02F 1/155 257/296 |
| 2015/0212382 A1 | 7/2015 | Miyazaki | |

OTHER PUBLICATIONS

Rachel Cinnsealach et al., "Coloured Electrochromic Windows Based on Nanostructured TiO2 Films Modified by Adsorbed Redox Chromophores," 57(2) Solar Energy Materials and Solar Cells 107-125 (Feb. 1999).

(Continued)

*Primary Examiner* — Tuyen Tra
(74) *Attorney, Agent, or Firm* — Fitzpatrick, Cella, Harper & Scinto

(57) ABSTRACT

Provided is an electrochromic element, including: a first electrode and a second electrode, at least one of the first electrode and the second electrode being transparent; a third electrode; and an electrolyte, an anodic organic electrochromic material, and a cathodic organic electrochromic material that are arranged between the first electrode and the second electrode, in which the third electrode is electrically connectable to at least one of the first electrode and the second electrode via the electrolyte, and in which the third electrode has an effective area that is larger than an effective area of the first electrode and an effective area of the second electrode.

17 Claims, 11 Drawing Sheets

(56) References Cited

OTHER PUBLICATIONS

David Cummins et al., "Ultrafast Electrochromic Windows Based on Redox-Chromophore Modified Nanostructured Semiconducting and Conducting Films," 104(48) J. Phys. Chem. B 11449-11459 (Nov. 2000).
Kubo et al., U.S. Appl. No. 15/191,827, filed Jun. 24, 2016.
Kubo et al., U.S. Appl. No. 15/191,843, filed Jun. 24, 2016.

* cited by examiner

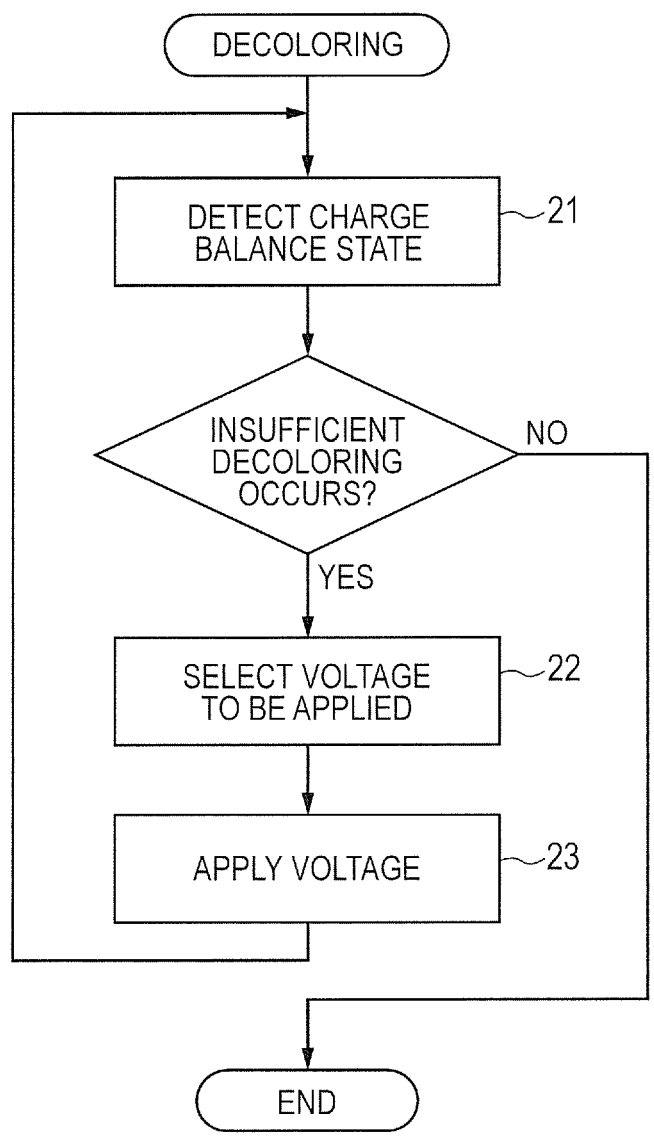

ELECTROCHROMIC ELEMENT, METHOD OF DRIVING THE SAME, AN OPTICAL FILTER, LENS UNIT, IMAGE PICK-UP DEVICE AND WINDOW MATERIAL

BACKGROUND OF THE INVENTION

Field of the Invention

The present invention relates to an electrochromic element and a method of driving the same, and further, to an optical filter, a lens unit, an image pickup apparatus, and a window member using the electrochromic element.

Description of the Related Art

An electrochromic (hereinafter sometimes abbreviated as "EC") element that uses an EC material as a substance that undergoes changes in optical absorption properties (absorption wavelength and absorbance) through an electrochemical redox reaction is applied to a display apparatus, a variable reflectance mirror, a variable transmission window, and the like. In such an EC element, suppression of change in optical characteristics as time progresses is one of the biggest challenges. In particular, in an EC element called a complementary EC element that uses an anodic EC material and a cathodic EC material, insufficient decoloring due to charge imbalance is a problem. Note that, the concept of charge balance/imbalance is described later.

In U.S. Pat. No. 6,188,505, there is disclosed use of a non-EC material that is more easily oxidized than an anodic EC material and a non-EC material that is more easily reduced than a cathodic EC material (those materials are hereinafter referred to as "redox buffers") in a complementary EC element in which the EC materials are dissolved in an electrolyte. In the EC element disclosed in U.S. Pat. No. 6,188,505, an oxidized form and a reduced form of the redox buffers are more stable than an oxidized form as a colored form of the anodic EC material and a reduced form as a colored form of the cathodic EC material, respectively. Therefore, even when charge imbalance occurs in decoloring operation, insofar as the amounts of charge of the redox buffers can cover, generation of the oxidized form and the reduced form of the corresponding redox buffers are dominant over remaining of the colored forms of the EC materials. The redox buffers are non-EC materials, and thus, even when the oxidized form and the reduced form of the redox buffers are generated, the redox reactions thereof do not affect the transmittance of light. In other words, the redox buffers add a charge balance region in which the color does not fluctuate so that the charge imbalance of the EC element does not directly result in insufficient decoloring.

However, in U.S. Pat. No. 6,188,505, the redox buffers are more easily oxidized than the anodic EC material or more easily reduced than the cathodic EC material, and thus, are more liable to react in terms of the potential than the EC materials. Therefore, in normal coloring operation of the EC element, the redox buffers react ahead of (at least equivalent to) the EC materials. As a result, there are problems in that, compared to a case in which the redox buffers are not used, a current that does not contribute to the coloring unnecessarily flows to increase the power consumption and to reduce the response speed.

Further, even when the redox buffers are used as in U.S. Pat. No. 6,188,505, charge imbalance between display electrodes is not eliminated. Specifically, only the colored forms of the EC materials are reduced (instead, the oxidized/reduced forms of the redox buffers that are not colored or decolored are generated), and the charge balance between the display electrodes is not affected. When charge imbalance occurs in a complementary EC element, the colored form ratio of the anodic EC material/the cathodic EC material changes. Specifically, the ratio of coloring of a material having a polarity opposite to that of a material remaining due to charge imbalance becomes smaller than the ratio of coloring of the material remaining due to charge imbalance. For example, when the EC element is colored from a charge imbalance state in which a colored form of the cathodic EC material remains, compared to a case in which charge imbalance does not occur, the ratio of coloring that comes from the anodic material is smaller than the ratio of coloring that comes from the cathodic material. As a result, an actual absorption spectrum different from an absorption spectrum that is assumed at design time appears as discoloration of a color absorbed by the EC element, which is not preferred. In U.S. Pat. No. 6,188,505, in decoloring operation, charge of an oxidized form of the anodic material or a reduced form of the cathodic material that remains due to charge imbalance is undertaken by the redox buffers to suppress remaining of the color of one polarity of the anodic material or the cathodic material. However the charge imbalance between the display electrodes is not corrected, and thus, the colored form ratio of the anodic EC material/the cathodic EC material cannot be corrected. In other words, even if charge imbalance between the display electrodes occurs, the color is not seen in decoloring operation, but, when coloring is performed again, a state in which the ratio between the anodic material and the cathodic material changes from the initial one state due to the imbalance appears.

SUMMARY OF THE INVENTION

Accordingly, it is an object of the present invention to provide an EC element that can eliminate insufficient decoloring due to charge imbalance without being accompanied by increased power consumption and by reduced response speed, and that is excellent in reproducing a spectrum in coloring operation is eliminated.

According to one embodiment of the present invention, there is provided an electrochromic element, including:

a first electrode and a second electrode, at least one of the first electrode and the second electrode being transparent; a third electrode; and an electrolyte, an anodic organic electrochromic material, and a cathodic organic electrochromic material that are arranged between the first electrode and the second electrode, in which the third electrode is electrically connectable to at least one of the first electrode and the second electrode via the electrolyte, and in which the third electrode has an effective area that is larger than an effective area of the first electrode and an effective area of the second electrode.

Further features of the present invention will become apparent from the following description of exemplary embodiments with reference to the attached drawings.

BRIEF DESCRIPTION OF THE DRAWINGS

FIG. 4 is a flow chart for illustrating the outline of a voltage control step.

DESCRIPTION OF THE EMBODIMENTS

Preferred embodiments of the present invention will now be described in detail in accordance with the accompanying drawings.

1. Charge Balance/Imbalance

Figure 3A:
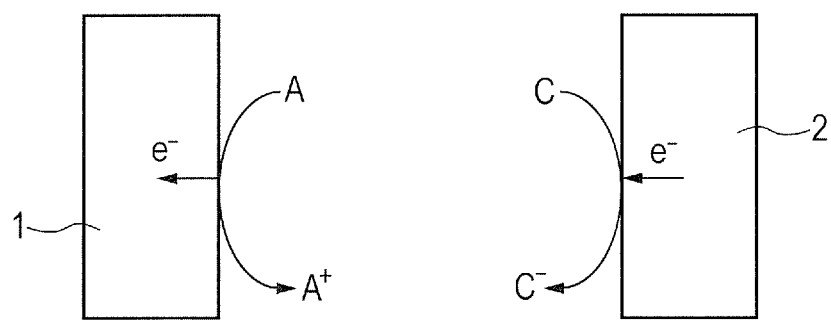
FIG. 3A, FIG. 3B, and FIG. 3C are illustrations of a concept of charge balance/imbalance.
Figure 3B:
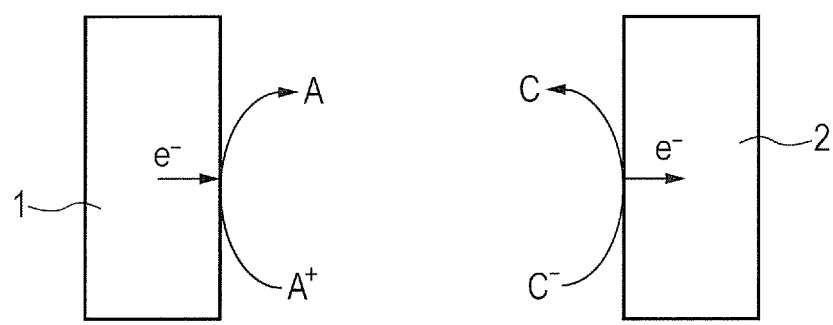
Figure 3C:
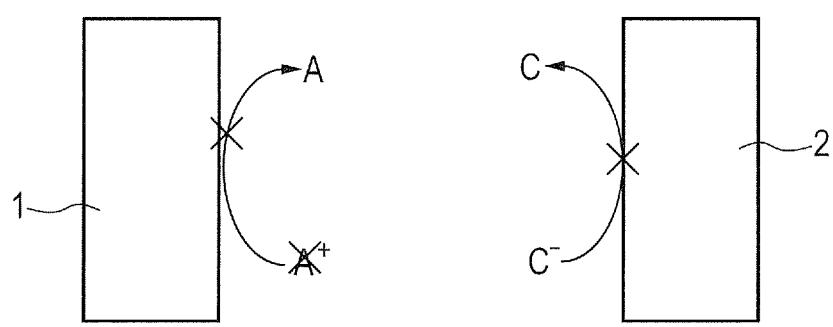

A concept of charge balance/imbalance is described with reference to FIG. 3A to FIG. 3C taking a case of a complementary organic EC element as an example. In FIG. 3A to FIG. 3C, a first electrode 1 is an anode and a second electrode 2 is a cathode. A reduced state (decolored state) of an anodic EC material is represented as A, an oxidized state (decolored state) of a cathodic EC material is represented as C, an oxidized state (colored state) of the anodic EC material is represented as $A^+$, and a reduced state (colored state) of the cathodic EC material is represented as $C^-$.

FIG. 3A is an illustration of a coloring process. When a coloring voltage is applied between the anode (first electrode 1) and the cathode (second electrode 2), an oxidation reaction of the anodic EC material progresses at the first electrode 1 and a reduction reaction of the cathodic EC material progresses at the second electrode 2. The anodic EC material is in the oxidized state (colored state) $A^+$ and the cathodic EC material is in the reduced state (colored state) $C^-$, and the EC element is in a colored state. FIG. 3B is an illustration of a decoloring process opposite to the process described above. When the EC element is decolored, a decoloring voltage (for example, 0 V with which the first electrode 1 and the second electrode 2 are short-circuited) is applied between the first electrode 1 and the second electrode 2 to progress a reaction opposite to the reaction illustrated in FIG. 3A. Thus, the anodic EC material is in a reduced state A and the cathodic EC material is in an oxidized state C, and hence the EC element returns to the decolored state. When the reactions illustrated in FIG. 3A and FIG. 3B are repeated, the charge balance of the EC element is normal, and the element normally repeatedly changes between the colored state and the decolored state.

Meanwhile, as the EC element is driven, the charge balance may be lost when a step other than the normal coloring/decoloring step is partly performed. There are some causes for losing the charge balance. Here, deterioration of the oxidized form $A^+$ of the anodic EC material is described as an example with reference to FIG. 3C. When the oxidized form $A^+$ of the anodic EC material that is colored through the normal coloring process is deteriorated and cannot react at the first electrode 1 any longer, at the second electrode 2, the reduced form $C^-$ of the cathodic EC material loses the recipient of the electrons thereof and cannot react any longer. Such a phenomenon is herein referred to as loss of charge balance or charge imbalance. As a result, insufficient decoloring occurs in the EC element in which the colored form $C^-$ of the cathodic EC material remains although the cathodic EC material is normal.

An irreversible electron transfer reaction (in particular, electrode reaction) of a substrate forming the redox reactions is a cause of the charge imbalance. Specifically, exemplary irreversible electron transfer reactions include a chemical reaction of an impurity (an impurity originating from the EC materials, an impurity originating from the environment (oxygen, water, or the like), or an impurity originating from a seal material), or between radicals. As examples, there are given remaining of the colored form of the anodic material by an irreversible reduction reaction of oxygen that enters as an impurity, and remaining of the colored form of the cathodic material by an irreversible oxidation reaction of a component contained in the seal material.

2. EC Element

Figure 1:
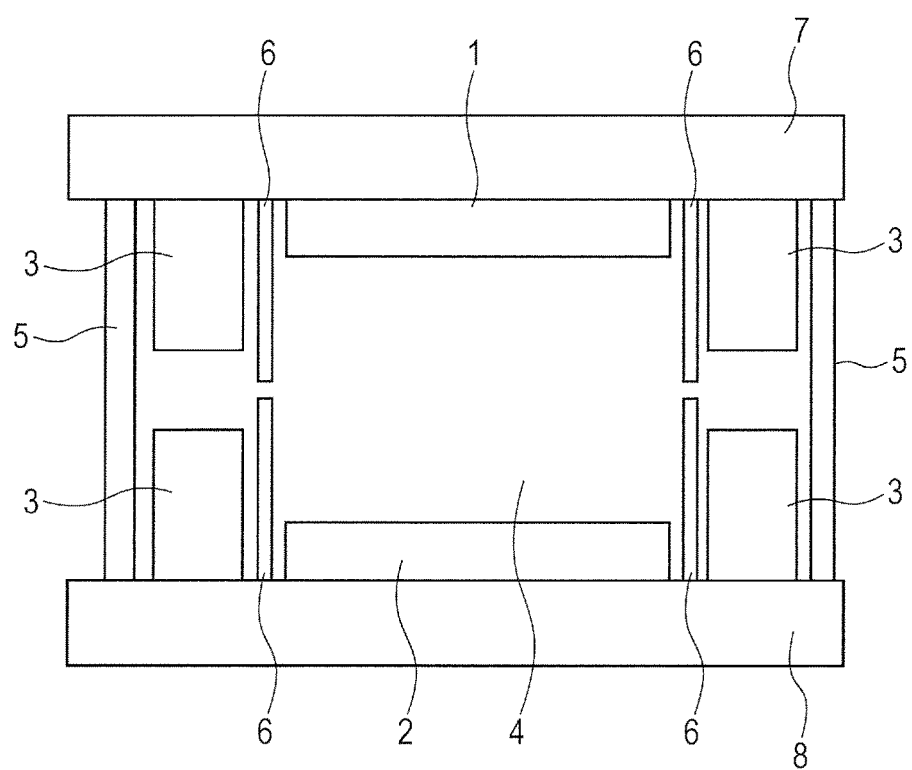
FIG. 1 is a schematic sectional view of an EC element according to the present invention.

FIG. 1 is a schematic sectional view of the EC element according to the present invention. In FIG. 1, the first electrode 1, the second electrode 2, a third electrode 3, and substrates 7 and 8 are illustrated. An electrolyte 4 is in contact with the first electrode 1, the second electrode 2, and the third electrode 3. It is preferred that the electrolyte 4 be held while being isolated from the outside by a seal material 5. Partitions 6 are formed as necessary for the purpose of suppressing substance transport between the first electrode 1 and the third electrode 3 and between the second electrode 2 and the third electrode 3.

(1) Substrates 7 and 8/Electrodes 1, 2, and 3

<First Electrode 1 and Second Electrode 2>

At least one of the first electrode 1 and the second electrode 2 is a transparent electrode. The term "transparent" as used herein means a property of transmitting light, and it is preferred that the transmittance of light be 50% or more and 100% or less. The reason is that, when at least one of the electrodes is a transparent electrode, light can be efficiently taken in from the outside of the EC element to interact with EC molecules, thereby enabling reflection of optical characteristics of the EC molecules on emitted light. Further, the term "light" as used herein means light in a wavelength region in which the EC element is intended to be used. For example, when the EC element is used as a filter of an image pickup apparatus for a visible light region, the term "light" means light in the visible light region, and, when the EC element is used as a filter of an image pickup apparatus for an infrared region, the term "light" means light in the infrared region.

As the transparent electrodes, there can be used electrodes obtained by forming a conductive layer of, for example, a transparent conductive oxide or dispersed carbon nanotubes on the transparent substrates 7 and 8 that are made of glass, a polymer compound, or the like, or transparent electrodes obtained by partly forming metal wires on the transparent substrates 7 and 8, or a combination thereof.

Examples of the transparent conductive oxide include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Of those, FTO is preferably used from the viewpoints of resistance to heat (from the viewpoint of accommodation to a calcination process performed when a porous electrode is formed), resistance to reduction, and conductivity, and ITO is preferably used from the viewpoints of conductivity and transparency. Further, it is preferred that the layer of the transparent conductive oxide have a thickness of from 10 nm to 10,000 nm. In particular, when the layer of the transparent conductive oxide is a layer of FTO or ITO having a thickness of from 10 nm to 10,000 nm, both a high transmission property and high chemical stability can be achieved, which is preferred. Note that, the layer of the transparent conductive oxide may have a structure in which sublayers each formed of the transparent conductive oxide are laminated. This facilitates realization of high conductivity and high transparency.

The metal wires are not particularly limited, but electrochemically stable metal wires formed of, for example, Ag, Au, Pt, or Ti are preferably used. Further, with regard to a pattern of arranging the metal wires, a grid-like pattern is preferably used. The electrode is typically a planar electrode, but a curved electrode may also be used as necessary.

As the other electrode of the first electrode 1 and the second electrode 2, a preferred electrode is selected depending on the intended use of the EC element. For example, when the EC element is a transmission-type EC element, it is preferred that the other electrode also be the transparent electrode described above. On the other hand, when the EC element is a reflection-type EC element, an electrode configured to reflect incident light may be used as the other electrode. Meanwhile, formation of a reflective layer or a scattering layer between the electrodes can improve flexibility of optical characteristics of the other electrode. For example, when such a reflective layer or a scattering layer is introduced between the electrodes, the electrode used at the back thereof may be opaque or may absorb light, because the electrode does not affect emitted light.

Irrespective of which mode of element the EC element of the present invention is, it is preferred to use, as a material for each of the first electrode 1 and the second electrode 2, a material which is stably present in an environment in which the EC element is operated, and which can allow a redox reaction to progress quickly in response to the application of a voltage from the outside.

With regard to an arrangement of the first electrode 1 and the second electrode 2, an arrangement generally known as an electrode arrangement in an EC element can be used. Typical examples include an arrangement in which the first electrode 1 and the second electrode 2 formed on the substrates 7 and 8, respectively, are formed so as to be opposed to each other as illustrated in FIG. 1. It is preferred that an interelectrode distance between the first electrode 1 and the second electrode 2 be 1 μm or more and 500 μm or less. A large interelectrode distance is advantageous in that the amounts of the EC materials that are sufficient for the EC element to effectively function can be arranged. On the other hand, a small interelectrode distance is advantageous in that high response speed can be attained.

A method of introducing light into the EC element can be freely selected depending on the intended use of the EC element. Typical examples are described below. As described above, when the EC element is a transmission-type EC element in which the first electrode 1 and the second electrode 2 are opposed to each other, incident light enters the EC element by passing through any one of the first electrode 1 and the second electrode 2. When the EC material is in the colored state, at least part of the light is absorbed by the EC material, and the rest of the light is emitted through the other electrode. When the EC element is a reflection-type EC element in which the first electrode 1 and the second electrode 2 are opposed to each other, and when the EC material is in the colored state, at least part of incident light passing through any one of the first electrode 1 and the second electrode 2 is absorbed, and the rest of the light is reflected by a reflective substance, a scattering substance, or the like to be emitted through the electrode through which the light has passed when entering the EC element. It is often the case that the reflective substance, the scattering substance, or the like is arranged between the first electrode 1 and the second electrode 2, but a structure in which the reflective substance, the scattering substance, or the like is arranged outside the electrode opposed to the electrode through which the incident light passes can also be selected.

<Third Electrode 3>

As described in "1. Charge Balance/Imbalance" section, in the EC element according to the present invention in which the cathodic EC material and the anodic EC material are used together, when charge imbalance occurs, there is a possibility that the charge imbalance is sensed as insufficient decoloring irrespective of whether the charge imbalance is anodic charge imbalance or cathodic charge imbalance. In such a case, even when a voltage between the first electrode 1 and the second electrode 2 is changed to a voltage of a polarity opposite to that in the coloring for the purpose of suppressing the insufficient decoloring (color remaining), the result is that the EC material of the opposite polarity is colored, and thus, the insufficient decoloring is not effectively suppressed. The term "EC material of the opposite polarity" as used herein means the cathodic EC material when the color of the anodic EC material remains, and means the anodic EC material when the color of the cathodic EC material remains. Therefore, according to the present invention, the third electrode 3 is introduced into the element, and the charge balance between display electrodes (between the first electrode 1 and the second electrode 2) is adjusted through control of a voltage between the third electrode 3 and the first electrode 1 and/or the second electrode 2.

The third electrode 3 can be electrically connected to at least one of the first electrode 1 and the second electrode 2 via the electrolyte 4. This is because, the third electrode 3 according to the present invention adjusts the charge balance through control of a voltage with the first electrode 1 and/or the second electrode 2, and realization of this requires electrical connection with at least one of the first electrode 1 and the second electrode 2 via the electrolyte 4. In the case illustrated in FIG. 1, the first electrode 1, the second electrode 2, and the third electrode 3 are in contact with the same electrolyte 4. Note that, in the case illustrated in FIG. 1, the third electrodes 3 are formed on the substrates 7 and 8, but the third electrode 3 may be formed on only any one of the substrates.

It is preferred that the third electrode 3 be an electrode that can, when a voltage is applied between the third electrode and the first electrode 1 and/or the second electrode 2, cause a current to flow in a method other than a method in which the EC material of the polarity opposite to that of the EC material reacting on the first electrode 1 or the second electrode 2 reacts on the third electrode 3. Specifically, it is preferred that the third electrode 3 be an electrode that can cause, for example, a capacitive current or a current based on ion insertion/release to flow. As a result of an investigation made by the inventors of the present invention, it is concluded that, use of an electrode having an effective area larger than those of the first electrode 1 and the second electrode 2 as the third electrode 3 enables more effective adjustment of the charge balance. The term "effective area" as used herein means a value that is a product of the projected area and porosity (roughness factor) of the electrode. The effective area can be evaluated by measurement using nitrogen gas adsorption (BET method), dye adsorption, or the like.

In order to realize the large effective area, it is particularly preferred that the third electrode 3 be a porous electrode having a porous structure. The term "porous structure" as used herein means a structure in which the ratio of the effective area to the projected area (roughness factor) is ten or more, preferably 100 or more. When the charge balance is attempted to be adjusted with capacitive charge, the amount of charge accumulated in an electrode is proportional to the effective area (if the projected area is the same, to the roughness factor). Therefore, the amount of the adjustable charge balance, that is, the number of insufficiently decolored molecules that can be decolored by the third electrode 3 is proportional to the effective area as well. Further, when the charge balance is attempted to be adjusted with charge based on ion insertion/release, from the viewpoint of a practical insertion depth of the ions, as the ratio of the surface area to the volume of the electrode becomes larger, a larger amount of charge can be obtained.

From the viewpoint of realizing a large effective area with a small projected area and of manufacture, it is preferred that the porous structure have a nanometer-scale fine structure. The shape and the manufacturing method of the porous structure are not limited, and a nanoparticle film having through holes, a nanostructure such as a nanorod, a nanowire, or a nanotube, or the like can be used. Of those, a particle film that has a large specific surface area per volume and is easy to manufacture is suitably used. With regard to the particle size, particles having an average particle diameter of 300 nm or less, preferably 50 nm or less are used. It is desired that the third electrode 3 have a thickness of 100 nm or more, preferably 1 μm or more.

Exemplary methods of manufacturing the porous electrode include a method in which an electrically isolated region is formed by etching or the like in part of the conductive substrate that forms the first electrode 1 or the second electrode 2 and the porous electrode is formed in the electrically isolated region. As a matter of course, after the porous electrode is formed, the region thereof may be electrically isolated by etching or the like.

One remarkable characteristic of an EC element compared to a liquid crystal element of a generally prevailing light absorbing device is that the maximum transmittance thereof is high. In order to make use of the high transmittance, it is desired that the number of elements that reduce the transmittance other than absorption by the EC materials when colored be as small as possible in an optical path of light entering the EC element until the light is emitted. In particular, when the third electrode 3 is arranged in the optical path, the third electrode 3 can also be an element that reduces the transmittance. When a material having a low bulk transmittance (of visible light) is used for the third electrode 3, the transmittance may be considerably reduced. Further, even if a material having a high bulk transmittance is used, when a difference in refractive index is large between the third electrode 3 and the electrolyte 4, the transmittance may be reduced by scattering or the like. In view of those, according to the present invention, it is preferred that the third electrode 3 be arranged out of an optical path of light that passes through at least one of the first electrode 1 and the second electrode 2. The term "out of an optical path" as used in this case means a state of being out of an optical path of light necessary for the intended use of the EC element as a light absorbing element from the above viewpoint. For example, when the EC element is used as a transmission-type filter of an image pickup apparatus, the optical path as used herein refers to an optical path of, among the entire light that passes through the EC element, light that reaches a region used for necessary image pickup among the entire region of a light-receiving element (for example, CMOS sensor). On the other hand, in the same case, even if the light passes through the EC element, if the light reaches a region other than the region used for necessary image pickup of the light-receiving element, the optical path of such light is out of the optical path as used herein. Arrangement of the third electrode 3 out of the optical path enables use of an electrode that scatters light and of an electrode that is not transparent, which improves flexibility in selecting the material. Further, even when the third electrode 3 is involved in coloring/decoloring through ion insertion/release, the third electrode 3 can be used without a problem.

Figure 2A:
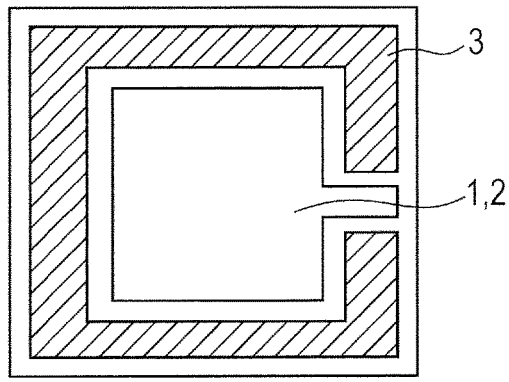
FIG. 2A, FIG. 2B, and FIG. 2C are schematic top views of the EC elements according to the present invention.
Figure 2B:
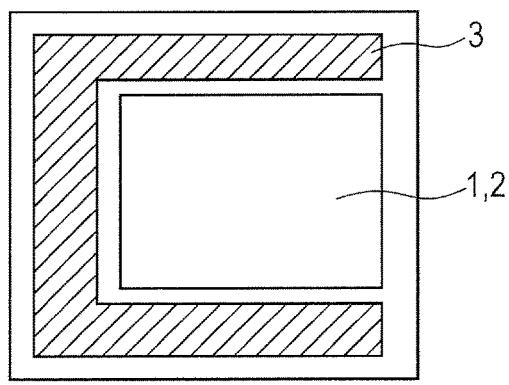
Figure 2C:
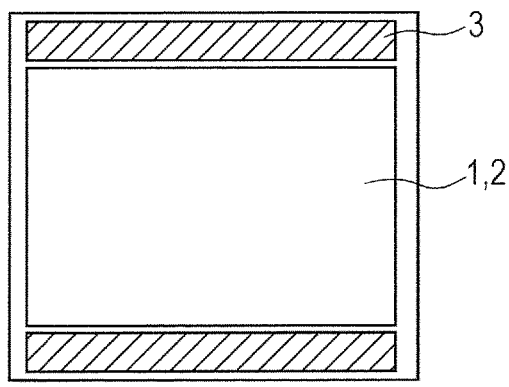

Further, when, in order to suppress the insufficient decoloring, the colored form of a remaining EC material is reduced on the first electrode 1 and/or the second electrode 2, it is desired that the reaction thereof occur uniformly on the electrode(s). From this viewpoint, it is preferred that the third electrode 3 be arranged, for example, as illustrated in FIG. 2A to FIG. 2C, in at least part of a periphery of the first electrode 1 and/or the second electrode 2. FIG. 2A to FIG. 2C are top views of EC elements according to the present invention, in which the first electrode 1 and the second electrode 2 completely overlap each other. The third electrode 3 may be arranged so as to surround four sides of the first electrode 1 and the second electrode 2 as illustrated in FIG. 2A, may be arranged so as to surround three sides of the first electrode 1 and the second electrode 2 as illustrated in FIG. 2B, or may be arranged so as to surround two sides of the first electrode 1 and the second electrode 2 as illustrated in FIG. 2C.

A film formed of the following material may be used as the third electrode 3: a metal oxide, such as tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), niobium-doped titanium oxide (TNO), or titanium oxide; a carbon material; a metal, such as platinum or titanium; or a combination thereof. In addition, a material through which a current associated with ion insertion/release can flow is preferably used as the third electrode 3. In addition to a porous film of the metal oxide described above, the following material is preferably used as the material: tungsten oxide, molybdenum oxide, niobium oxide, vanadium oxide, or the like.

(2) Partitions 6 (Reduction of Substance Transport)

It can be said that the third electrode 3 functions as a place for holding, when insufficient decoloring occurs in the EC element, charge for an electrochemical decoloring reaction of an EC material that remains as a colored form even in decoloring operation on the first electrode 1 and/or the second electrode 2. Therefore, it is desired that an EC material that is normally colored in coloring do not reach the third electrode 3. When the EC materials are fixed onto the first electrode 1 and the second electrode 2, respectively, it is not necessary to give specific consideration. However, when an EC material can be freely diffused, for example, when an EC material is dissolved in the electrolyte 4, the EC material may reach the third electrode 3, thereby converting a colored form into a decolored form. In order to suppress this, it is effective to reduce substance transport between the first electrode 1 and/or the second electrode 2 where coloring is performed and the third electrode 3, specifically, to keep a distance therebetween, or to arrange a structure configured to reduce the substance transport. A specific example of the former includes making the distance between the first electrode 1 and/or the second electrode 2 and the third electrode 3 larger than the distance between the first electrode 1 and the second electrode 2. An example of the latter includes a method in which a partition 6 having an opening formed therein, preferably having a porous structure, is formed between the first electrode 1 and/or the second electrode 2 and the third electrode 3. The reason that the partition 6 is required to have an opening formed therein is that, in order for the third electrode 3 to effectively function, it is necessary to secure an electrical connection between the first electrode 1 and/or the second electrode 2 and the third electrode 3 via the electrolyte 4. Conversely, it is preferred that substance transport between the first electrode 1 and/or the second electrode 2 and the third electrode 3 be reduced insofar as electrical connection between the first electrode 1 and/or the second electrode 2 and the third electrode 3 via the electrolyte 4 is secured to an extent necessary for achieving effective charge balance.

(3) Seal Material 5

It is preferred that the substrates 7 and 8 be joined together with the seal material 5 under a state in which electrode surfaces of the first electrode 1 and the second electrode 2 are opposed to each other. As the seal material 5, a material that has stable characteristics after the sealing without being affected by the electrolyte 4, that is electrochemically stable and does not electrochemically react in operation of the EC element, that is less liable to pass a gas and a liquid therethrough, and that does not inhibit the redox reactions of the EC materials is preferred. For example, an inorganic material such as glass frit, an organic material such as an epoxy-based or acrylic-based resin, or a metal can be used as the material. If the characteristics after the sealing are unstable to the electrolyte 4, there is a fear of contamination of an electrode with the eluted seal material. Further, if a component of the seal material 5 is electrochemically unstable, charge imbalance may occur due to an electrode reaction. Further, if a gas and a liquid (in particular, oxygen and moisture) are liable to pass through the seal material 5, charge imbalance may occur due to an electrode reaction therewith. Therefore, attention is required to be given. Note that, the seal material 5 may have the function of keeping the distance between the first electrode 1 and the second electrode 2 through inclusion of a spacer material or the like. When the seal material 5 does not have the function of defining the interelectrode distance, a spacer may be additionally arranged to keep the interelectrode distance. The following material may be used as a material for the spacer: an inorganic material, such as silica beads or glass fibers; or an organic material, such as a polyimide, polytetrafluoroethylene, polydivinylbenzene, fluororubber, or an epoxy resin. With the spacer, the distance between the electrodes of the EC element can be regulated and kept.

(4) Electrolyte 4

The EC element according to the present invention includes, between the first electrode 1 and the second electrode 2, the electrolyte 4, an anodic organic EC material, and a cathodic organic EC material. The anodic organic EC material and the cathodic organic EC material may be dissolved in the electrolyte 4, or may be fixed to the first electrode 1 and the second electrode 2, respectively. A case in which the anodic organic EC material and the cathodic organic EC material are dissolved in the electrolyte 4 is advantageous over a case in which the anodic organic EC material and the cathodic organic EC material are fixed to the electrodes, respectively, in the following two respects. (I) There is no restricting factor of the surface areas of the electrodes to which the EC materials are fixed, and thus, the amount of the EC materials that can exist in the electrolyte 4 is large. (II) When the EC materials are fixed, both the EC materials to be fixed and the electrodes to which the EC materials are fixed often require structural devices and a manufacturing process, but those requirements are eliminated.

On the other hand, a case in which the anodic organic EC material and the cathodic organic EC material are fixed to the electrodes, respectively, is advantageous over a case in which the EC materials are dissolved in the electrolyte 4 in the following respects. The EC materials are bound to the electrodes, and thus, (I) it is not necessary to manufacture a structure such as the partition 6, and (II) a response speed reduction, which is due to substance transport until the EC materials reach the electrodes, respectively, is eliminated.

The electrolyte 4 as used herein includes both concepts of the electrolyte itself and an electrolyte solution in which the electrolyte is dissolved in a solvent. As the electrolyte, one prepared by dissolving a salt compound in a solvent, in which a salt compound itself also serves as a solvent, or the like can be used.

The solvent for forming the electrolyte 4 is selected depending on the intended use in consideration of, for example, the solubilities of solutes including the EC material, vapor pressures, viscosities, and potential windows, and is preferably a solvent having polarity. Specific examples thereof include water and organic polar solvents, such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methylpyrrolidinone, and dioxolane. Of those, a cyclic ester compound or a nitryl compound is preferably used, and in particular, propylene carbonate is most preferably used.

Further, the solvent may further contain a polymer or a gelling agent to make the solvent a highly viscous one or a gel-like one. The polymer which may be contained in the solvent is not particularly limited. Examples thereof include polyacrylonitrile, carboxymethylcellulose, polyvinyl chloride, polyethylene oxide, polypropylene oxide, polyurethane, polyacrylate, polymethacrylate, polyamide, polyacrylamide, polyester, and Nafion (trade name) and sugar compounds. In order to improve the characteristics of the polymer or the gelling agent, a functional group is preferably added thereto. Specifically, a cyano group, a hydroxyl group, an ester group, an ether group, an amide group, an amino group, a carboxylic acid group, a sulfonic acid group, or the like may be added.

The salt compound to be used for the electrolyte 4 is not particularly limited as long as the salt compound is an ion dissociative salt, shows satisfactory solubility in the solvent and high compatibility with a solid electrolyte, and is stable at the operation potential of the EC element. Suitable ions selected from various cations and anions may be used in combination. Examples of the cations include: various metal ions, such as alkali metal and alkaline earth metal ions; and organic ions, such as a quaternary ammonium ion. Specific examples thereof may include ions of Li, Na, K, Ca, Ba, tetramethylammonium, tetraethylammonium, and tetrabutylammonium. Examples of the anions include anions of various fluorine compounds and halide ions. Specific examples thereof include $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$. In addition, through use of an EC material of a salt compound, a solution of the EC material also serves as an electrolyte solution. An example of the EC material of the salt compound may be a viologen derivative salt.

Among the cations described above, cations having a small size, in particular, lithium ions and hydrogen ions, can cause a current to flow through insertion/release thereof into/from an oxide of various kinds or into/from a carbon material. When a current is caused to flow through the third electrode 3 according to the present invention, in addition to a capacitive current, a current due to ion insertion/release described above can be used as well.

Examples of the EC material may include both low-molecular-weight organic compounds and high-molecular-weight organic compounds. Any of the materials is a material that is colored by applying electric stimulation from the outside. The term "low-molecular-weight" as used herein refers to a molecular weight of 2,000 or less, preferably 1,000 or less. An example of the high-molecular-weight organic compound is a high-molecular-weight compound including a pyridinium salt. A specific example thereof is a viologen-based high-molecular-weight compound. An EC material that is preferably used in the present invention is a low-molecular-weight organic compound, and is a molecule in which its decolored form is changed into its colored form through an oxidation reaction or a reduction reaction at the electrode.

The EC materials used for the EC element according to the present invention is both the anodic EC material and the cathodic EC material. The anodic EC material may include a plurality of kinds of anodic EC materials and the cathodic EC material may include a plurality of kinds of cathodic EC materials. The term "anodic EC material" as used herein means a material that is colored by an oxidation reaction thereof in which electrons are removed from the material, and, on the other hand, the term "cathodic EC material" as used herein means a material that is colored by a reduction reaction thereof in which electrons are given to the material.

Examples of the anodic EC material include a thiophene derivative, an amine having an aromatic ring, a pyrrole derivative, a thiazine derivative, a triallylmethane derivative, a bisphenylmethane derivative, a xanthene derivative, a fluoran derivative, and a spiropyran derivative. Of those, low-molecular-weight thiophene derivatives (such as a monothiophene derivative, an oligothiophene derivative, and a thienoacene derivative) and low-molecular-weight amines each having an aromatic ring (such as a dihydrophenazine derivative and a triallylamine derivative) are preferred. The reason is that, use of those materials facilitates provision of an EC element that has a desired absorption wavelength profile. Those molecules have an absorption peak in the ultraviolet region in a neutral state, do not exhibit absorption in the visible light region, and are in a decolored state having a high transmittance in the visible light region. Through an oxidation reaction, those molecules are converted into radical cations to shift the absorption to the visible light region, resulting in a colored state. The absorption wavelength and the potential at which the redox reactions proceed of the molecules may be designed by increasing or decreasing its π-conjugation length, or changing substituents to make a change to the π-conjugation system.

Examples of the cathodic EC material include a pyridine-based compound, such as a viologen derivative, and a quinone compound. The absorption wavelength and the potential at which the redox reactions proceed of the molecules also may be designed through increasing or decreasing its π-conjugation length, or changing substituents to make a change to the π-conjugation system.

It is preferred that the EC materials be fixed to the first electrode 1 and the second electrode 2, respectively. One reason is that, in the EC element according to the present invention, when the charge imbalance is adjusted, it is only necessary that charge is given/received between the electrodes, and it is not necessary that the EC materials be diffused to reach the third electrode 3. Another reason is that such a risk is low that the EC materials reach the third electrode 3, thereby converting the colored form that is normally colored into the decolored form. Exemplary fixing includes bonding of the EC materials to the electrode materials via functional groups in molecules of the EC materials, collectively holding the EC materials using electrostatic interactions or the like, and physical adsorption of the EC materials on the electrodes. Among them, from the viewpoint of realizing quick response of the EC element, a system in which low-molecular-weight organic compounds are chemically bonded to the porous electrodes via functional groups, and a system in which polymer organic compounds are formed on the electrodes are preferred. A specific example of the former system may be a system in which a low-molecular-weight EC material is fixed to an oxide fine-particle electrode of titanium oxide, zinc oxide, tin oxide, or the like via a functional group, such as an acid group (such as a phosphoric acid group or a carboxylic acid group). An example of the latter system is a system in which a viologen polymer is formed on the transparent electrode through polymerization. Examples of the method of forming a viologen polymer on the transparent electrode through polymerization include electrolytic polymerization.

The electrolyte 4 (including the EC materials when the EC materials are dissolved therein) can be, for example, after an opening is formed in part of the first electrode 1, the second electrode 2, or the seal material 5 and the joining is performed, injected through the opening by a vacuum injection method, an atmospheric injection method, a meniscus method, or the like, and the opening can be sealed. Further, a dropping and bonding method without an inlet is also preferably used.

(5) Unit Configured to Detect Charge Balance State

When both of the anodic EC material and the cathodic EC material are used as in the present invention, color remaining due to charge imbalance includes a case in which the color of the anodic EC material remains and a case in which the color of the cathodic EC material remains. For the purpose of effective decoloring in both of the cases, it is necessary to apply a voltage depending on the polarity of the charge imbalance to the third electrode 3 and to the first electrode 1 and/or the second electrode 2.

At this time, if a voltage of the opposite polarity is applied, the charge imbalance increases, the colored form of the material having the remaining color increases, and the extent of the insufficient decoloring increases. Thus, detection of the polarity of the charge imbalance is important. Further, even when the polarity is appropriate, if the amount of introduced charge exceeds the extent of the charge imbalance, charge imbalance of the opposite polarity may occur. Therefore, control of the voltage and the amount of charge depending on the detected charge balance state (polarity and extent) is important. It is preferred that the EC element according to the present invention include a unit configured to detect the charge balance state of the EC element. Exemplary units configured to detect the charge balance state of the EC element include a detecting unit using light absorption by the EC material, and a detecting unit configured to measure an electrode potential.

Exemplary detecting units using light absorption by the EC material include a unit configured to compare the amounts of light absorption at characteristic absorption wavelengths of the anodic EC material and the cathodic EC material, respectively, that are included in the EC element, more specifically, for example, a combination of a light source at characteristic absorption wavelengths of the anodic EC material and the cathodic EC material, respectively, and a light-receiving element configured to detect light that is emitted from the light source to enter the EC element and exit therefrom, and a combination of a light source at characteristic absorption wavelengths of the anodic EC material and the cathodic EC material, respectively, and a light-receiving element configured to separately detect light characteristic of the respective materials. The amounts of change in absorbance from the initial decolored state at the respective absorption wavelengths are obtained. When there is a difference between the amounts of change, it can be determined that the charge balance is in a state in which the color of the EC material of the larger amount of change remains to an extent in proportion to the amount of change in absorbance.

The light source and the light-receiving element are not limited insofar as the pair have light intensity and sensitivity necessary for the detection and do not adversely affect the characteristics of the EC element when the EC element is used as intended. Exemplary light sources include an LED, and exemplary light-receiving elements include a photodiode.

Exemplary detecting units configured to measure an electrode potential include a unit configured to measure the potential of the first electrode 1 and/or the second electrode 2 using a reference electrode or the like. A specific example is described below. A case is considered in which operation for maximizing the transmittance of the EC element, for example, short-circuiting the first electrode 1 and the second electrode 2 is performed, and still the color of the anodic EC material remains due to charge imbalance, that is, part of the anodic EC material is in the oxidized state. Note that, a case in which the color of the cathodic EC material remains can be similarly thought except that the polarity is the opposite. Here, as a representative of the two cases, the case in which the color of the anodic EC material remains is described. In this case, most of the cathodic EC material in the EC element is in the reduced state (decolored state), and thus, the potential of the first electrode 1 and/or the second electrode 2 is thought to be defined by the ratio of the oxidized form/the reduced form of the anodic EC material. In general, a material to be used as an EC material exhibits redox characteristics having a high degree of reversibility. The reason is that, not exhibiting a high degree of reversibility results in lower responsivity, lower durability, and increased power consumption. Therefore, the exhibited potential is a value slightly shifted from a standard electrode potential of the anodic EC material by an amount in proportion to a natural logarithm of the concentration ratio (to be precise, activity ratio) of the oxidized form/the reduced form in accordance with the Nernst equation. This can be used to detect the charge balance state. For example, in a system in which anodic and cathodic EC materials are dissolved in an electrolyte and are freely movable, the determination can be made based on which of the redox potential of the anodic EC material and the redox potential of the cathodic EC material is closer to the potential of the first electrode 1 and/or the second electrode 2. For example, when the electrode potential is closer to the redox potential of the cathodic EC material, it can be determined that the charge balance is in a state in which the color of the cathodic EC material remains. When the anodic and cathodic EC materials are fixed to the first electrode 1 and the second electrode 2, respectively, the charge balance can be determined from the direction and the amount of the shift of the potential of the fixed electrode from the redox potential of the corresponding fixed material. An example is described below. The following are assumed. The potential of the electrode to which the cathodic EC material is fixed is a potential at which most of the cathodic EC material is thought to be in the oxidized form (sufficiently positive with respect to the redox potential). At the same time, the potential of the electrode to which the anodic EC material is fixed is close to the redox potential to the extent that the oxidized form/reduced form of the anodic EC material are thought to coexist. In this case, it can be determined that the charge balance is in a state in which the color of the anodic EC material remains.

The unit configured to detect the charge balance state may be mounted to the EC element. Mounting the unit to the EC element can realize, even when, for example, the EC element is replaced, operation that reflects characteristics specific to the EC element without fail. On the other hand, the unit may be mounted to a portion other than the EC element as necessary. For example, when the EC element is used in a window, the unit may be mounted to a window frame or the like, and, when the EC element is used in a camera, the unit may be mounted to a camera main body or the like. This is preferred in that limitations on the volume are alleviated and the possibility of common use of the circuit is improved.

3. Method of Driving EC Element

A method of driving the EC element according to the present invention includes a step of controlling a voltage between at least one of the first electrode 1 and the second electrode 2 and the third electrode 3 depending on the detected charge balance state of the EC element. FIG. 4 is a schematic illustration of the voltage control step.

First, in a first step 21, with regard to the EC element that is in the decolored state through application of the decoloring voltage between the first electrode 1 and the second electrode 2, the charge balance state of the EC element is detected by the unit configured to detect the charge balance state or by visual observation. In this way, it is determined whether the insufficient decoloring occurs or not. When it is determined that the insufficient decoloring does not occur, the voltage control step ends.

Figure 5:
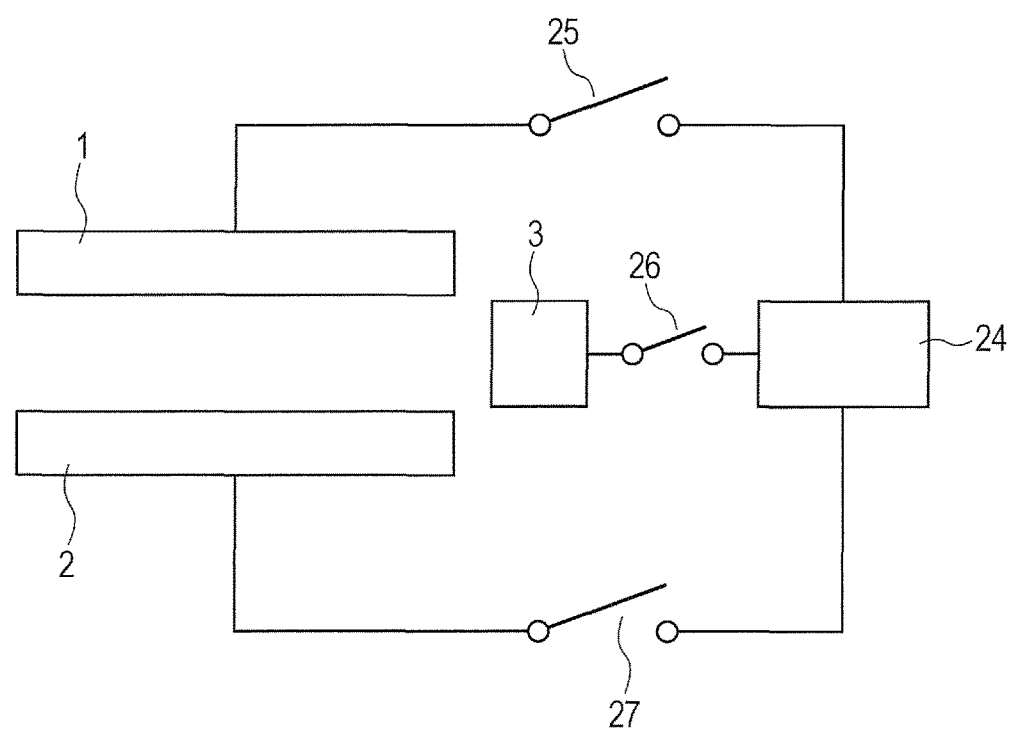
FIG. 5 is a schematic view for illustrating an exemplary drive circuit of the EC element according to the present invention.

When, in the first step 21, it is determined that the insufficient decoloring occurs, in a second step 22, a voltage to be applied between at least one of the first electrode 1 and the second electrode 2 and the third electrode 3 is selected depending on the charge balance state detected in the first step 21. If the selection of the voltage to be applied, in particular, selection of the polarity is erroneous, as described in "(5) Unit Configured to Detect Charge Balance State" section, the extent of the insufficient decoloring is increased, and thus, the selection of the voltage is important. A method of applying the voltage between at least one of the first electrode 1 and the second electrode 2 and the third electrode 3 is described with reference to FIG. 5. FIG. 5 is a schematic view for illustrating an exemplary drive circuit of the EC element according to the present invention. The drive circuit illustrated in FIG. 5 includes a variable voltage source 24, and switches 25, 26, and 27 connected between the variable voltage source 24 and the electrodes 1, 2, and 3, respectively. In normal drive, the switches 25 and 27 are in an ON state and the switch 26 is in an OFF state, and a voltage is applied between the first electrode 1 and the second electrode 2. In the second step 22, any one of the following three is selected.

(a) The switches 25 and 26 are in the ON state and the switch 27 is in the OFF state so that a voltage is applied between the first electrode 1 and the third electrode 3.

(b) The switches 26 and 27 are in the ON state and the switch 25 is in the OFF state so that a voltage is applied between the second electrode 2 and the third electrode 3.

(c) The switches 25, 26, and 27 are in the ON state so that a voltage is applied between the first electrode 1 and the third electrode 3, and between the second electrode 2 and the third electrode 3.

In a third step 23, through application of the voltage selected in the second step 22, the lost charge balance is rebalanced to reduce the color remaining.

In the third step 23, control of the amount of charge introduced through application of the voltage is important.

The amount of charge means the amount of correction for the charge imbalance. Even when the polarity of the voltage selected in the second step 22 is appropriate (at the beginning of the application), if the amount of introduced charge exceeds the extent of the charge imbalance, charge imbalance of the opposite polarity may occur. Therefore, it is important that the amount of charge be an amount appropriate for charge rebalancing. In order to attain this, a mechanism configured to measure the amount of introduced charge is preferably introduced into a drive mechanism of the EC element.

Specifically, the mechanism is preferably mounted on the variable voltage source 24. Further, in order to adjust the amount of introduced charge, a method is also preferably used in which a small amount of charge is introduced at a time and the charge balance state after the introduction is detected again to determine whether or not additional voltage application is necessary.

By, after this third step 23, performing again the first step 21, and subsequently the second step 22 and the third step 23 as necessary, and repeating the steps, the charge balance is adjusted, the color remaining is suppressed, and the defective color display in the coloring is improved. It is also preferred to perform control of the voltage to be applied, the voltage application time, and the amount of introduced charge in the next step in a feedback way through comparison between the charge balance states before and after the series of the steps 21 to 23 are performed.

A method of selecting the voltage to be applied in the second step 22 is described below. In the driving method according to the present invention, when insufficient decoloring occurs in the EC element, the electrochemical decoloring reaction of the EC material that remains as a colored form on the first electrode 1 and/or the second electrode 2 is caused to occur. Charge of the opposite polarity for attaining this is compensated for by the third electrode 3. It follows that the voltage is to be applied between the first electrode 1 and/or the second electrode 2 and the third electrode 3. When the anodic and cathodic EC materials are fixed to the first electrode 1 and the second electrode 2, respectively, the voltage is applied between at least the electrode to which the EC material that remains as a colored form due to the charge imbalance is fixed and the third electrode 3. When the anodic and cathodic EC materials are, for example, dissolved in the electrolyte and are freely movable without being fixed to the first electrode 1 and the second electrode 2, respectively, the voltage is applied between at least one of the first electrode 1 and the second electrode 2 and the third electrode 3. In this case, application of the voltage both between the first electrode 1 and the third electrode 3 and between the second electrode 2 and the third electrode 3 increases the electrode area on which the remaining colored form reacts to increase the amount of reaction per unit time. As a result, the insufficient decoloring can be eliminated in a short time, which is thus preferred.

The specific value of the voltage to be applied varies depending on the EC material and the electrode materials that are used, but a basic idea is described below. First, with regard to the polarity of the voltage, when the colored form of the anodic EC material remains due to charge imbalance, a voltage having a polarity such that the third electrode 3 is positive and the first electrode 1 and/or the second electrode 2 are/is negative is applied. On the other hand, when the colored form of the cathodic EC material remains due to charge imbalance, a voltage having a polarity such that the third electrode 3 is negative and the first electrode 1 and/or the second electrode 2 are/is positive is applied.

An absolute value of the voltage depends on the amount of charge necessary for decoloring the remaining colored form. In brief, as the remaining color becomes darker, a larger value is necessary. When the amount of charge is secured using a capacitive current, the amount of charge is a product of a capacitance and the applied voltage, and thus, increases in proportion to the number of molecules of the remaining colored form:

$$Q=CV=nFN$$

(Q: the amount of charge, C: capacitance, V: applied voltage, n: the number of electrons necessary for decoloring a molecule of the remaining colored form, F: Faraday's constant, and N: the number of molecules of the remaining colored form (the number of moles)).

When charge due to ion insertion/release at the third electrode 3 is used, first, the voltage is required to be higher than a voltage necessary for realizing a potential at which ion insertion/release to the electrode starts. After the voltage exceeds the value, the voltage is increased based on the number of molecules of the colored form that is to be decolored. The potential varies depending on the electrodes that are used and ions that are inserted. The voltage is further affected by a material that reacts on the first electrode 1 and/or the second electrode 2 in a pair. As an example of the potential, in the case of a combination of a porous titanium oxide electrode and lithium ions, through application of a potential that is less than about −0.4 V to a Ag/Ag$^+$ (acetonitrile and NO$_3^-$) electrode, lithium ions can be inserted into the porous titanium oxide electrode. As another factor, if the absolute value of the voltage is too large, deteriorating reaction of the EC material and the electrolyte may occur. Therefore, it is important that the voltage be set in a range in which the optical characteristics and the like of components of the element are not adversely affected when the element is used. A typical range of the applied voltage V is approximately represented as 0 V<V<5 V.

It is preferred that the voltage application time be a time period that is longer than a time taken for an electric double layer to be formed on a surface of the electrode and for a faradaic current to begin to flow and is shorter than a time taken for the charge balance to exceed a normal point and for the color of the remaining colored form of the EC material of the opposite polarity to be exhibited. The voltage application time greatly depends on the response speed of the EC element, and specifically, is 1 ms or more and 10 s or less, for example. It is also preferred that the voltage be applied for a short time, and, based on the result thereof, the next voltage application time be selected.

4. Effects

According to the present invention, through use of the third electrode 3, insufficient decoloring due to charge imbalance in the EC element can be eliminated. As a typical example, the transmittance can be improved through conversion into the decolored form of the colored form of an EC material, which remains even when operation for maximizing the transmittance of the EC element is performed. A method using redox buffers as disclosed in U.S. Pat. No. 6,188,505 is also a measure against insufficient decoloring due to charge imbalance.

However, as described in "Problem to be Solved by the Invention" section, the method using the redox buffers does not eliminate the charge imbalance between display electrodes. Therefore, the ratio between the extent of contribution of the colored form of the anodic EC material and the extent of contribution of the colored form of the cathodic EC material in a spectrum in the colored state of the EC element cannot be corrected.

On the other hand, in the method using the third electrode according to the present invention, through application of a voltage between the first electrode 1 and/or the second electrode 2 and the third electrode 3 so that an electrochemical reaction that decolors the remaining colored form of an EC material may occur, the lost charge balance between the display electrodes is rebalanced. In other words, the charge balance in the EC element does not change as a whole, but the charge imbalance between the display electrodes is undertaken by the third electrode 3. In this case, in coloring, the third electrode 3 is not used and only the first electrode 1 and the second electrode 2 are used for the drive, and thus, such a state that the ratio between the extent of contribution of the anodic material and the extent of contribution of the cathodic material in the spectrum in the colored state is changed due to charge imbalance is not reproduced. Therefore, through use of the method using the third electrode according to the present invention, the spectrum of the EC element in the colored state can be corrected.

Figure 6A:
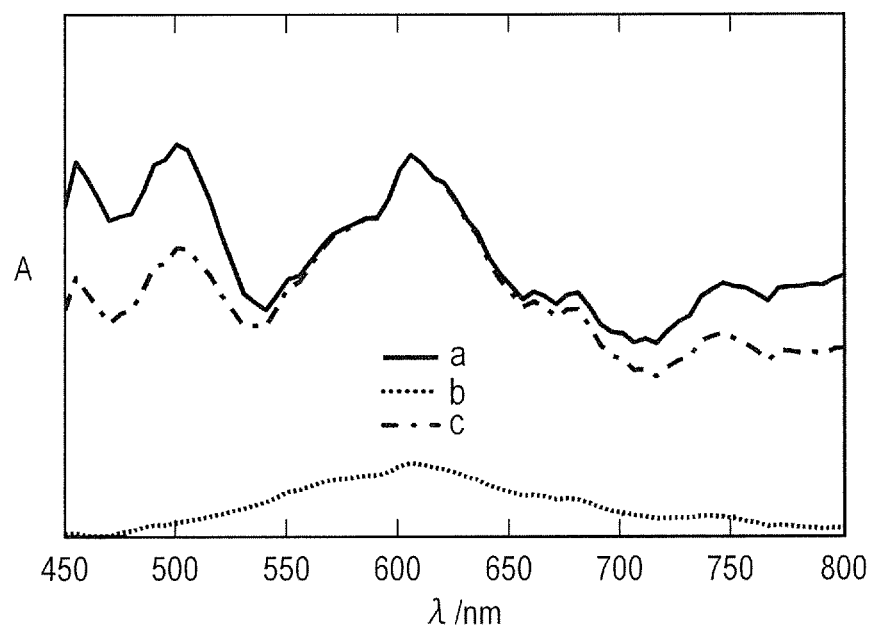
FIG. 6A and FIG. 6B are graphs for showing absorption spectra of the EC element.
Figure 6B:
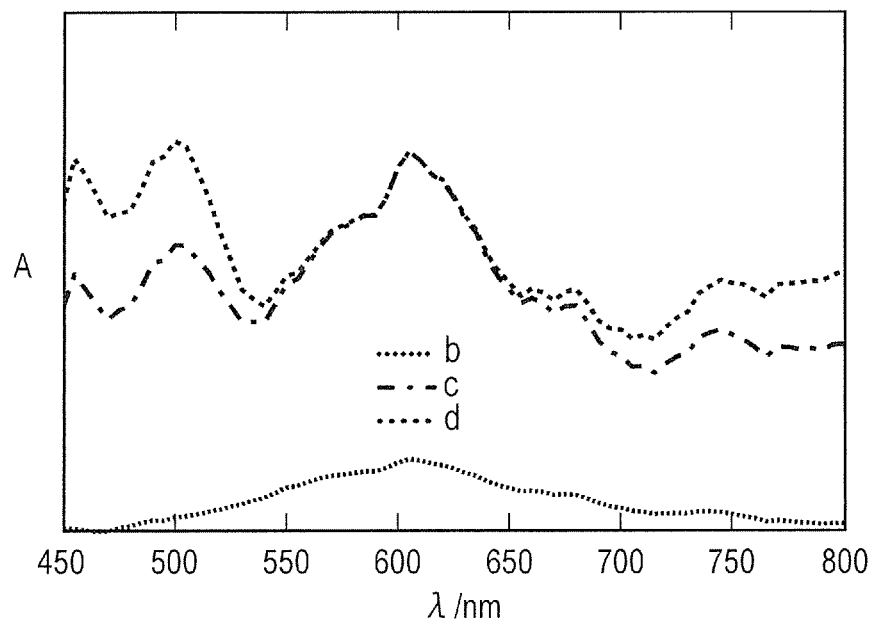

Description is made in the following with reference to the drawings. FIG. 6A and FIG. 6B are graphs for showing absorption spectra of EC elements. Note that, FIG. 6A is a graph for showing an absorption spectrum of an EC element unrelated to the present invention, and FIG. 6B is a graph for showing an absorption spectrum of the EC element according to the present invention. Further, in FIG. 6A and FIG. 6B, there are shown exemplary calculations of absorption spectra (vertical axis: absorbance, horizontal axis: wavelength) of the EC elements when an anodic EC material and a cathodic EC material are used. In the EC elements described above, the anodic EC material has characteristic absorption peaks at 455 nm and 500 nm, and the cathodic EC material has a characteristic absorption peak at 605 nm. In the EC elements described above, the absorption spectra of the EC elements described above when the charge balance is normal are represented by a spectrum a in FIG. 6A. Absorption spectra when the charge balance of the EC elements described above changes in a direction in which the colored form of the cathodic EC material remains are represented by spectra b in FIG. 6A and FIG. 6B. In this case, absorption spectra of the EC elements in the colored state are represented by spectra c in FIG. 6A and FIG. 6B, in which the absorption of the anodic EC material is lower than that in the spectrum a when the charge balance is normal (at 455 nm and 500 nm). The change in spectrum due to change in charge balance cannot be eliminated even with use of the redox buffers.

According to the present invention, the third electrode is used in this state. Specifically, a potential difference is applied between the third electrode and the first electrode and/or the second electrode, with the third electrode being the negative side. As a result, negative charge is accumulated in the third electrode, and the cathodic material that remains in the colored state is oxidized to be reproduced as the oxidized form that is the decolored form (or, the anodic material is the oxidized form, and the anodic material being the oxidized form and the cathodic material that remains in the colored state (reduced state) react, resulting in the decolored state (oxidized state) of the cathodic material). In this way, in the method according to the present invention, the lost charge balance can be rebalanced, and thus, the spectrum when the charge balance is in the normal state can be maintained as a spectrum d in FIG. 6B. Note that, the spectrum d in FIG. 6B is in good agreement with the spectrum a in FIG. 6A. Thus, it is shown in FIG. 6A and FIG. 6B that the EC element according to the present invention maintains a spectrum in a normal state. Further, in a case in which the anodic EC material remains as a colored form in decoloring operation of the EC element, through inverting the polarity of the applied voltage, a similar effect can be obtained.

As described above, according to the method of the present invention, the problems that cannot be solved even using redox buffers as in U.S. Pat. No. 6,188,505 can be solved. Specifically, increased power consumption, reduced response speed, and change in ratio between the colored form of the anodic EC material and the colored form of the cathodic EC material in normal coloring operation of an EC element can be solved.

With regard to use of the EC element, the EC element according to the present invention can be used as a structural member of an optical filter, an image pickup apparatus, a lens unit, a window member, or the like.

5. Optical Filter

An optical filter of the present invention has the EC element of the present invention. The optical filter of the present invention preferably has a driving unit configured to drive the EC element, and may further include a peripheral apparatus. In addition, the optical filter of the present invention may have a transistor connected to the EC element. The transistor may be directly connected to the EC element, or may be indirectly connected thereto through any other element. Examples of the transistor include a TFT element and an MIM element.

The optical filter may be used in an image pickup apparatus, such as a camera. When used in the image pickup apparatus, the optical filter may be arranged in a main body of the image pickup apparatus, or may be arranged in a lens unit. Now, a case is described where a neutral density (ND) filter is formed as the optical filter.

The neutral density filter absorbs black, and needs to absorb light uniformly in a visible light region. In order to realize the black absorption with the use of the organic EC material, it is only necessary that a plurality of materials having different absorption regions in the visible light region be mixed to make absorption flat in the visible light region. The absorption spectrum in the case of mixing the organic EC materials is expressed by a sum of the absorption spectra of the respective materials, and hence the black absorption can be realized by selecting a plurality of materials having appropriate wavelength regions and adjusting concentrations thereof.

An example of driving the neutral density (ND) filter according to the present invention is described below. In general, the neutral density (ND) filter reduces an amount of light to $1/2^n$ (where n is an integer). When the amount of light is reduced to 1/2, the transmittance is reduced from 100% to 50%. When the amount of light is reduced to 1/4, the transmittance is reduced from 100% to 25%. Further, when the transmittance is reduced to 1/2, from a relationship of −log(transmittance)=(absorbance), the absorbance change amount is 0.3, and when the transmittance is reduced to 1/4, the absorbance change amount is 0.6. In order to reduce the light amount so that the transmittance varies, for example, from 1/2 to 1/64, it is only necessary that the absorbance change amount be controlled to be from 0 to 1.8 in units of 0.3.

When the electrolyte is in a solution state, the absorbance change amount includes a change amount of the colored amount that is caused by a fluctuation of the solution. In order to achieve accurate control, the optical filter may be equipped with an external monitor configured to measure a light amount as a part of the optical filter.

6. Image Pickup Apparatus and Lens Unit

An image pickup apparatus according to the present invention includes the optical filter according to the present invention and a light-receiving element configured to receive light that has passed through the optical filter.

Further, a lens unit according to the present invention includes the above-mentioned optical filter according to the present invention and an optical system including a plurality of lenses. The optical filter may be arranged so that the light that has passed through the optical filter then passes through the optical system. Alternatively, the optical filter may be arranged so that the light that has passed through the optical system then passes through the optical filter.

Figure 7A:
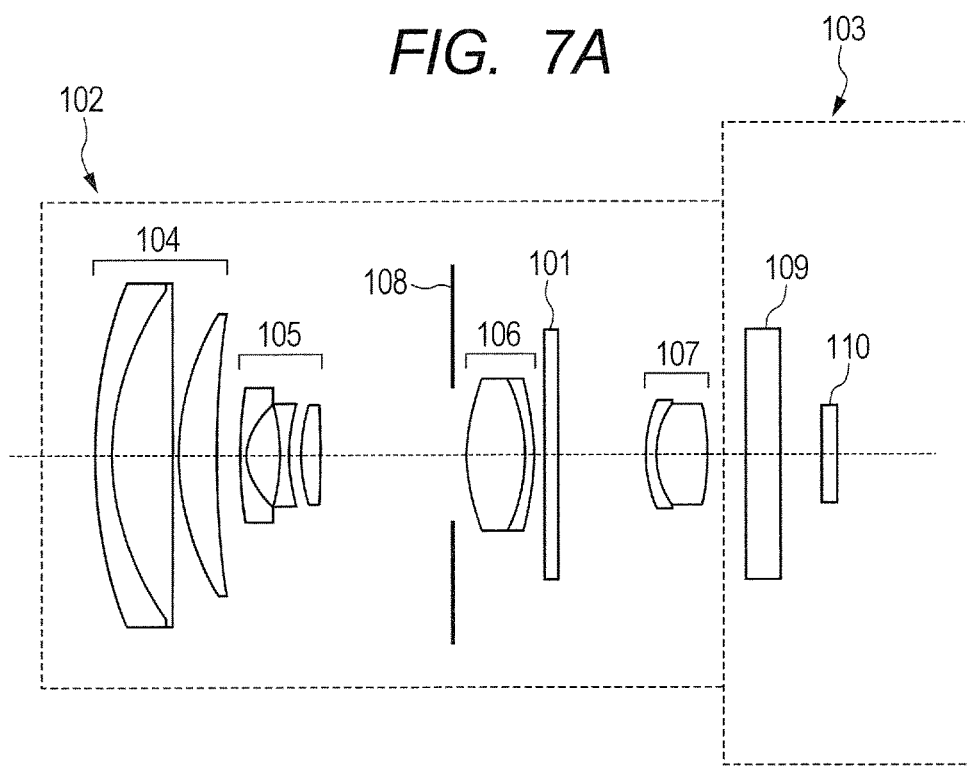
FIG. 7A and FIG. 7B are illustrations of exemplary image pickup apparatus according to the present invention.
Figure 7B:
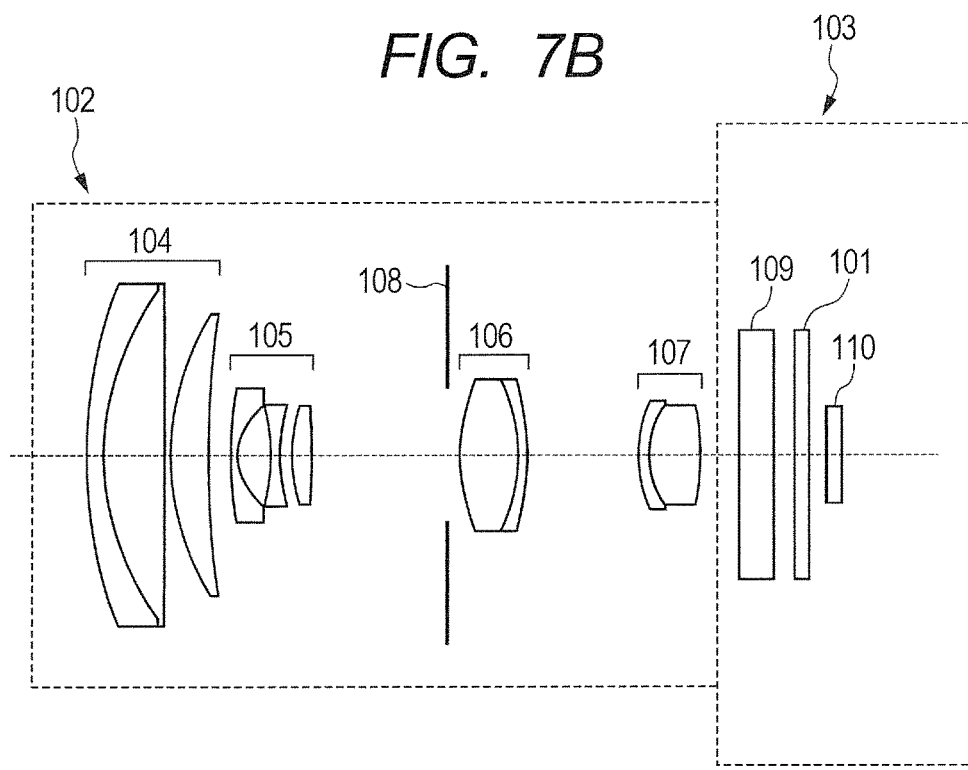

FIG. 7A and FIG. 7B are schematic views for illustrating image pickup apparatus using the optical filter of the present invention, and FIG. 7A is an illustration of an image pickup apparatus including a lens unit using the optical filter of the present invention and FIG. 7B is an illustration of an image pickup apparatus including the optical filter of the present invention. As illustrated in FIG. 7A and FIG. 7B, a lens unit 102 is removably connected to an image pickup apparatus 103 through a mounting member (not shown).

The lens unit 102 is a unit including a plurality of lenses or lens groups. For example, the lens unit 102 illustrated in FIG. 7A is a rear-focus zoom lens configured to perform focusing behind a diaphragm. The lens unit 102 includes, in order from a subject side (left side of the drawing), four lens groups of a first lens group 104 having a positive refractive power, a second lens group 105 having a negative refractive power, a third lens group 106 having a positive refractive power, and a fourth lens group 107 having a positive refractive power. An interval between the second lens group 105 and the third lens group 106 is changed to vary magnification, and a part of lenses of the fourth lens group 107 is moved to perform focusing. For example, the lens unit 102 includes a diaphragm 108 arranged between the second lens group 105 and the third lens group 106, and further includes an optical filter 101 arranged between the third lens group 106 and the fourth lens group 107. Those components are arranged so that the light passing through the lens unit 102 passes through the lens groups 104 to 107, the diaphragm 108, and the optical filter 101, and the amount of light can be adjusted with the use of the diaphragm 108 and the optical filter 101.

Further, a configuration of the components of the lens unit 102 can be modified appropriately. For example, the optical filter 101 may be arranged in front of the diaphragm 108 (on the subject side thereof), or may be arranged behind the diaphragm 108 (on the image pickup apparatus 103 side thereof). Alternatively, the optical filter 101 may be arranged in front of the first lens group 104, or may be arranged behind the fourth lens group 107. When the optical filter 101 is arranged at a position where light converges, there is an advantage in that an area of the optical filter 101 can be reduced, for example. Further, a mode of the lens unit 102 can also be selected appropriately. Instead of the rear-focus zoom lens, the lens unit 102 may also be an inner-focus zoom lens configured to perform focusing in front of the diaphragm, or may be another type of zoom lens configured to perform focusing in another way. Further, instead of the zoom lens, a special-purpose lens, such as a fisheye lens or a macro lens, can also be selected appropriately.

A glass block 109 of the image pickup apparatus is a glass block such as a low-pass filter, a face plate, or a color filter. Further, a light-receiving element 110 is a sensor unit configured to receive light that has passed through the lens unit 102, and an image pickup element such as a CCD or a CMOS may be used as the light-receiving element 110. Further, the light-receiving element 110 may also be an optical sensor such as a photodiode, and a device configured to acquire and output information on intensity or wavelength of light can be used appropriately as the light-receiving element 110.

When the optical filter 101 is built into the lens unit 102 as illustrated in FIG. 7A, a driving unit may be arranged within the lens unit 102, or may be arranged outside the lens unit 102. When the driving unit is arranged outside the lens unit 102, the EC element and the driving unit, which are respectively arranged within and outside the lens unit 102, are connected to each other through wiring, and the driving unit drives and controls the EC element.

As illustrated in FIG. 7B, the image pickup apparatus 103 itself may include the optical filter 101 according to the present invention. The optical filter 101 is arranged at an appropriate position within the image pickup apparatus 103, and it is only necessary that the light-receiving element 110 be arranged so as to receive the light that has passed through the optical filter 101. In FIG. 7B, for example, the optical filter 101 is arranged immediately in front of the light-receiving element 110. When the image pickup apparatus 103 itself has the optical filter 101 built therein, the lens unit 102 itself connected to the image pickup apparatus 103 does not need to include the optical filter 101, and hence it is possible to form the image pickup apparatus using an existing lens unit and being capable of controlling light.

The image pickup apparatus described above is applicable to a product having a combination of a function of adjusting a light amount and a light-receiving element. The image pickup apparatus can be used in, for example, a camera, a digital camera, a video camera, or a digital video camera. The image pickup apparatus is also applicable to a product having the image pickup apparatus built therein, such as a mobile phone, a smartphone, a PC, or a tablet computer.

Through the use of the optical filter according to the present invention as a light control member, it is possible to appropriately vary a light amount to be controlled with the use of one filter, and there is an advantage in that the number of members can be reduced and that a space can be saved, for example.

7. Window Member

Figure 8A:
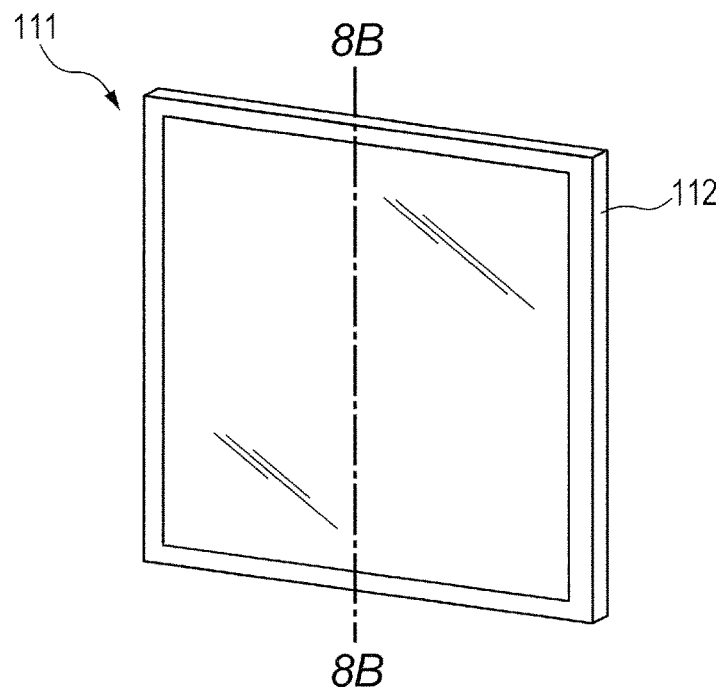
FIG. 8A and FIG. 8B are illustrations of an exemplary window member according to the present invention.
Figure 8B:
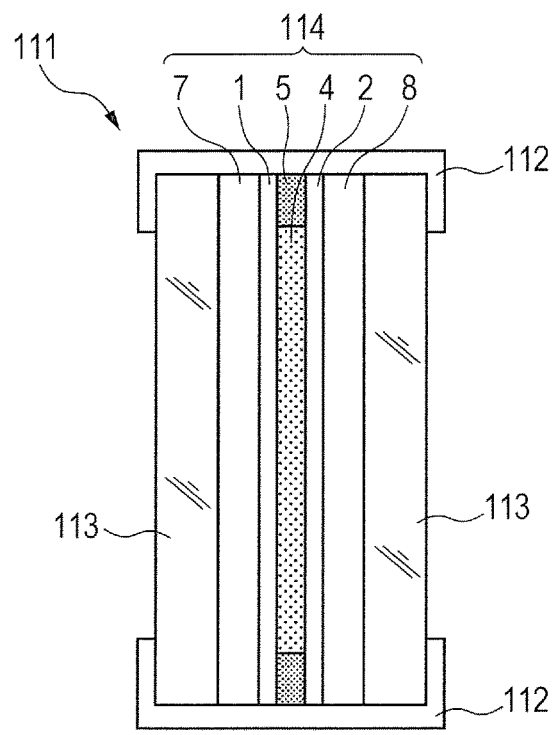

A window member according to the present invention includes the EC element according to the present invention. The window member according to the present invention preferably includes a driving unit configured to drive the EC element. FIG. 8A and FIG. 8B are views each for illustrating the window member according to the present invention. FIG. 8A is a perspective view of the window member, and FIG. 8B is a sectional view taken along the line 8B-8B of FIG. 8A.

A window member 111 of FIG. 8A and FIG. 8B is a light control window, and includes an EC element 114 (the third electrode 3 is not illustrated), transparent plates 113 configured to sandwich the EC element 114 therebetween, and a frame 112 configured to surround the entire window member to integrate those components into one window member. The driving unit may be built into the frame 112, or may be arranged outside the frame 112 and connected to the EC element 114 through wiring.

The transparent plates 113 are not particularly limited as long as being made of a material having a high optical transmittance. Considering the use of the window member 111 as a window, it is preferred that the transparent plates 113 be made of glass materials. In FIG. 8A and FIG. 8B, the EC element 114 is a constituent member independent of the transparent plates 113, but for example, the substrates 7 and 8 of the EC element 114 may be regarded as the transparent plates 113.

A material property of the frame 112 is not limited, but any member that covers at least a part of the EC element 114 and has a form of being integrated into one frame may be regarded as the frame.

The light control window described above is applicable to, for example, use of adjusting an amount of sunlight entering a room during the daytime. The light control window can be used to adjust not only the amount of sunlight but also a heat quantity, and hence can be used to control brightness and temperature of the room. Further, the light control window is also applicable to use as a shutter to prevent an indoor view from being seen from the outside of the room. The light control window described above is applicable not only to a glass window for a construction, but also to a window of a vehicle such as an automobile, a train, an airplane, or a ship, and to a filter of a display surface of a clock, a watch, or a mobile phone.

The present invention is more specifically described below by way of Examples. However, the present invention is not limited thereto.

SYNTHESIS EXAMPLE 1

Synthesis of Compound 1

A synthesis example of Compound 1 serving as the anodic EC material is described below.

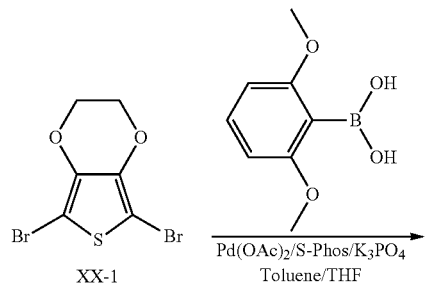

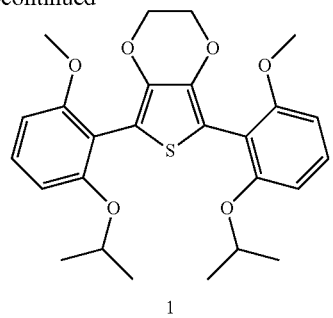

In a 50-milliliter reaction vessel, 500 mg (1.67 mmol) of XX-1 (2,5-dibromoethylene dioxythiophene) and 1.05 g (5.0 mmol) of 2-isopropoxy-6-methoxyphenylboronic acid were mixed in a mixed solvent of toluene/tetrahydrofuran (10 ml/5 ml), and nitrogen was used to remove dissolved oxygen.

Next, 19 mg (0.083 mmol) of Pd (OAc)$_2$, 89 mg (0.22 mmol) of 2-dicyclohexylphosphino-2',6'-dimethoxybiphenyl (S-Phos), and 1.92 g (8.35 mmol) of tripotassium phosphate were added thereto under a nitrogen atmosphere, and the reaction was performed for 7 hours while being heated to reflux at 110° C.

The reaction solution was cooled to room temperature, and then concentrated under reduced pressure, and separated and purified by silica gel chromatography (mobile phase: hexane/ethyl acetate=4/3) to provide Compound 1 as white solid powder (420 mg, yield: 54%).

Measurement was performed by MALDI-MS to confirm that M$^+$ of the compound was 470. The measurement result of an NMR spectrum is shown below.

$^1$H-NMR (CDCl$_3$) σ (ppm): 7.21 (t, 2H), 6.63 (d, 2H), 6.60 (d, 2H), 4.41 (m, 2H), 4.20 (s, 4H), 3.81 (s, 6H), 1.25 (s, 6H), 1.24 (s, 6H).

SYNTHESIS EXAMPLE 2

Synthesis of Compound 2

Compound 2 serving as the cathodic EC material was synthesized based on the document of Cinnsealach et al. (Solar Energy Materials and Solar Cells Vol. 57 (1999) 107-125).

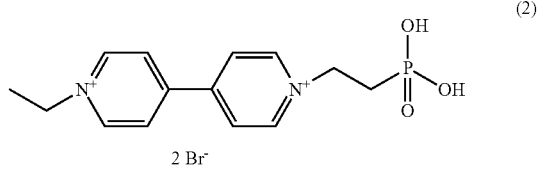 [SMILES: CC[n+]1ccc(-c2cc[n+](CCP(=O)(O)O)cc2)cc1]

SYNTHESIS EXAMPLE 3

Synthesis of Compound 3

Compound 3 serving as the anodic EC material was synthesized based on the document of Cummins et al. (Journal of Physical Chemistry B 104 (2000) 11449-11459).

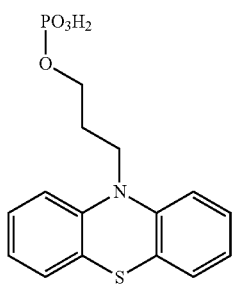

EXAMPLE 1

1. Production of Element

Figure 9A:
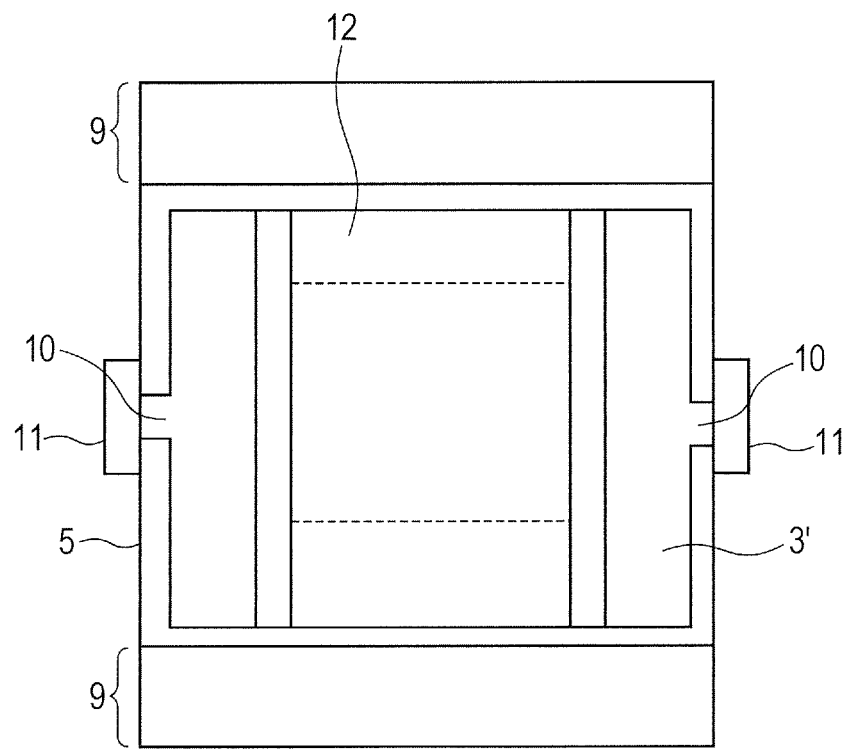
FIG. 9A and FIG. 9B are schematic views for illustrating an EC element of Example 1.
Figure 9B:
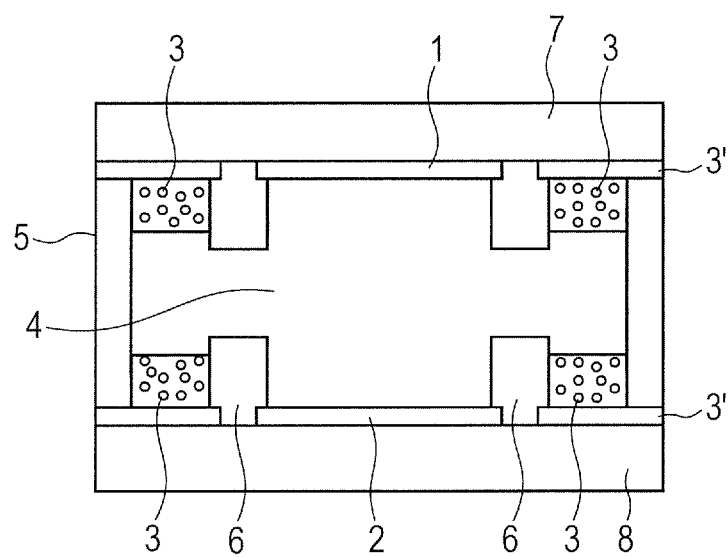

The element illustrated in FIG. 9A and FIG. 9B was produced. FIG. 9A is a schematic top view of the EC element, and FIG. 9B is a schematic sectional view of the EC element.

[Preparation of Electrode and Substrate]

Two transparent conductive glass (TEC15, Nippon Sheet Glass Co., Ltd.) sheets with fluorine-doped tin oxide (FTO) films were prepared. A part of the FTO film of the two sheets transparent conductive glass sheets was removed using a diamond tool, a first electrode 1 or a second electrode 2 was formed in the middle, and a third electrode formation region 3' electrically isolated from the first electrode 1 or the second electrode 2 was formed at each end.

[Production of Third Electrode 3]

12 g of antimony-doped tin oxide (ATO) nanoparticles (manufactured by Ishihara Sangyo Kaisha, Ltd.), 2 mL of concentrated nitric acid, and 200 mL of water were mixed, and were stirred at 80° C. for 8 hours, and were dried under vacuum for 1 day. To 4 g of the cake of the nanoparticles, 20 mL of water, 1.2 g of polyethylene glycol, and 0.4 g of hydroxypropyl cellulose were added, and the mixture was stirred for 15 days to prepare a slurry. The slurry was applied to the third electrode formation region 3', and was calcinated under the conditions of 500° C. and 30 minutes to provide an ATO nanoparticle film as the third electrode 3. A specific surface area of the nanoparticle film was 450 $cm^2/cm^2$.

[Bonding of Substrate]

A UV-curable adhesive (TB3035B, manufactured by ThreeBond Co., Ltd.) mixed with 100-micrometer spacer beads as the seal material 5 was applied to a periphery of two sheets of the transparent conductive glass having the third electrode 3 formed thereon except for electrode extraction regions 9 and inlets 10. The same adhesive that did not contain beads therein as partitions 6 was applied between the first electrode 1 or the second electrode 2 and the third electrode 3 so as to have a height of 40 μm. Then, the two transparent conductive glass sheets were laminated on each other so that the first electrode 1 and the second electrode 2 were opposed to each other and so that the third electrodes 3 were opposed to each other, and were irradiated with UV to cure the adhesive.

[Injection of Solution]

As an electrolyte solution, a propylene carbonate solution of 0.1 M tetrabutylammonium perchlorate was used. 20 mM of 5,10-dimethyl-5,10-dihydrophenazine as the anodic EC material, and 20 mM of ethyl viologen perchlorate as the cathodic EC material were dissolved in the solution. The solution was injected through the inlet 10 and sealed (11) with the UV-curable adhesive described above to produce the EC element. The first electrode 1 and the second electrode 2 both had a projected (≈effective) area of 3.6 $cm^2$, and the third electrodes 3 had a projected area of 4.2 $cm^2$ and an effective area of $1.8 \times 10^3$ $cm^2$.

[Arrangement of Unit Configured to Detect Charge Balance State]

An LED having a light emission wavelength of 460 nm and an LED having a light emission wavelength of 595 nm were arranged so as to be in contact with an upper surface of a region 12 of the EC element. The wavelengths correspond to the absorption wavelength of the anodic EC material and the absorption wavelength of the cathodic EC material, respectively. Further, a photodiode was arranged so as to be in contact with a lower surface of the region 12 as a unit configured to detect absorbance ratios at the respective wavelengths.

2. Endurance Drive of EC Element

A voltage of 1.0 V was applied between the first electrode 1 and the second electrode 2 of the EC element so that the EC element was in the colored state. After a lapse of one week, the first electrode 1 and the second electrode 2 were short-circuited so that the EC element was decolored. At this time, the amounts of change in absorbance from the initial decolored state at 460 nm and at 595 nm were +0.05 and ±0.00, respectively. It was confirmed that insufficient decoloring occurred in which the colored form of the anodic EC material having an absorption peak at 455 nm remained.

3. Reduction of Insufficient Decoloring

Under a state in which the first electrode 1 and the second electrode 2 of the EC element were short-circuited, a voltage was applied between the first electrode 1 and the third electrode 3. The application time was 20 ms. The operation was in the following sequence.

(i) The applied voltage was started at 0.1 V (the third electrode 3 was positive and the first electrode 1 was negative). Comparison of the absorbance was made between before the voltage application and after a lapse of 200 ms since the voltage application. When, through the application, no change was observed, or the absorbance at 460 nm increased, the voltage was increased in units of 0.1 V.

(ii) When the amount of change in absorbance at 460 nm from the initial decolored state was 0.005 or less, the voltage application ended.

(iii) When the amount of change in absorbance at 595 nm from the initial decolored state was 0.005 or more, the voltage application ended.

The result was that the voltage application ended after about three minutes from the start of the drive in accordance with Item (ii) above, and it was confirmed that the insufficient decoloring in which the colored form of the anodic EC material remained was reduced to 1/10 or less. Further, through visual observation of the EC element after the processing, it was confirmed that the insufficient decoloring was uniformly reduced and was almost no longer visible.

EXAMPLE 2

1. Production of Element

Figure 10A:
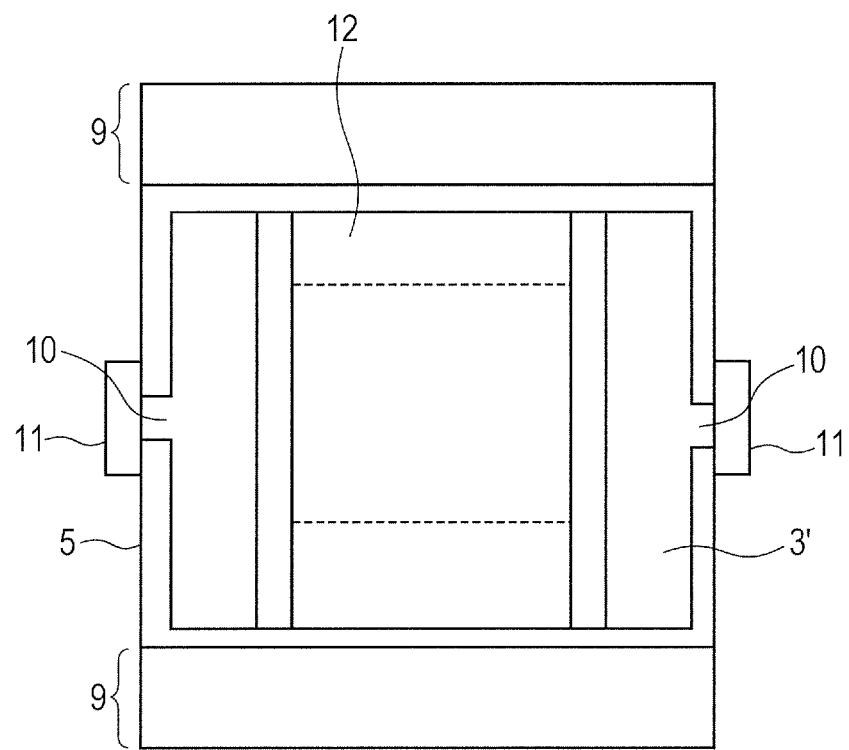
FIG. 10A and FIG. 10B are schematic views for illustrating an EC element of Example 2.
Figure 10B:
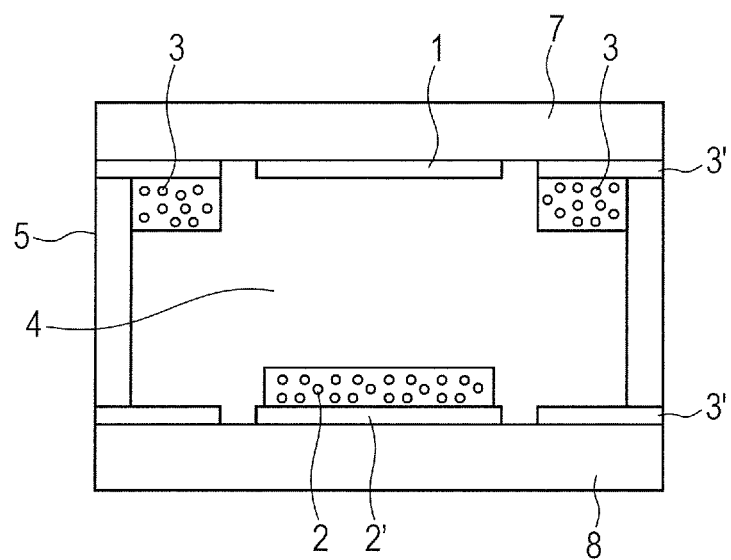

The element illustrated in FIG. 10A and FIG. 10B was produced. FIG. 10A is a schematic top view of the EC element, and FIG. 10B is a schematic sectional view of the EC element.

[Preparation of Electrode and Substrate]

Two transparent conductive glass sheets were prepared in the same manner as in Example 1. A part of a FTO film of one of the transparent conductive glass sheets was removed using a diamond tool, and the first electrode 1 was formed in the middle and a third electrode formation region 3' electrically isolated from the first electrode 1 was formed at each end. Further, a part of a FTO film of the other of the transparent conductive glass sheets was removed using the diamond tool, and a second electrode formation region 2' was formed in the middle and the third electrode 3 electrically isolated from the second electrode formation region 2' was formed at each end.

[Production of Second Electrode 2]

A titanium oxide nanopaste (Nanoxide-HT, manufactured by Solaronix SA) was applied to the second electrode formation region 2', and was calcinated under the conditions of 500° C. and 30 minutes. After the calcination, the electrode was soaked in a 5 mM aqueous solution of Compound 2 serving as the cathodic EC material overnight, was washed with water, and was dried to form the second electrode 2 to which the cathodic EC material had been fixed. A specific surface area of the nanoparticle film was 300 $cm^2/cm^2$.

[Production of Third Electrode 3]

A tin oxide nanoparticle slurry (manufactured by CIK Nanotec Ltd.) having an average particle diameter of 21 nm, and a zinc oxide nanoparticle slurry (manufactured by CIK Nanotec Ltd.) having an average particle diameter of 34 nm were mixed such that the volume ratio of tin oxide:zinc oxide was 2:1. In addition, a small amount of an inorganic binder was added thereto in order to improve flatness of the film surface and to prevent peeling, to thereby provide a nanoparticle-mixed slurry. The mixed slurry was applied to the third electrode formation region 3', and was calcinated under the conditions of 500° C. and 30 minutes, and then only zinc oxide was etched with dilute hydrochloric acid to provide a nanoparticle film as the third electrode 3. A specific surface area of the nanoparticle film was 650 $cm^2/cm^2$.

[Bonding of Substrate]

An UV-curable adhesive serving as the seal material 5 that was the same as the one used in Example 1 and that did not contain beads therein was applied to a periphery of the transparent conductive glass having the second electrode 2 formed thereon except for the electrode extraction regions and the inlets 10. The other transparent conductive glass was put on top of the transparent conductive glass so that the first electrode 1 and the second electrode 2 were opposed to each other and so that the third electrodes 3 were opposed to each other, and UV was radiated to cure the adhesive.

[Injection of Solution and Arrangement of Unit Configured to Detect Charge Balance State]

As an electrolyte solution, a propylene carbonate solution of 0.1 M lithium perchlorate was used. 10 mM of the compound 1 as the anodic EC material was dissolved in the solution. The solution was injected through the inlet 10 and sealed (11) with the UV-curable adhesive described above to manufacture the EC element. Then, similarly to Example 1, the unit configured to detect the charge balance state was arranged. The first electrode 1 had a projected (≈effective) area of 3.6 $cm^2$, the second electrode 2 had a projected area of 3.6 $cm^2$ and an effective area of $1.1 \times 10^3$ $cm^2$, and the third electrodes 3 had a projected area of 4.2 $cm^2$ and an effective area of $2.7 \times 10^3$ $cm^2$.

2. Endurance Drive of EC Element

After a cycle test for 24 hours in which a rectangular wave of 1.68 V for 5 seconds and 0 V for 20 seconds was applied between the first electrode 1 and the second electrode 2 of the EC element, the first electrode 1 and the second electrode 2 were short-circuited so that the EC element was decolored. At this time, the amounts of change in absorbance from the initial decolored state at 460 nm and at 595 nm were +0.002 and +0.07, respectively. It was confirmed that insufficient decoloring occurred in which the colored form of the cathodic EC material having an absorption peak at 605 nm remained.

3. Reduction of Insufficient Decoloring

The short-circuit between the first electrode 1 and the second electrode 2 of the EC element was released, and a voltage was applied between the second electrode 2 and the third electrode 3. The application time was 100 ms. The operation was in the following sequence.

(i) The applied voltage was started at 0.1 V (the third electrode 3 was negative and the second electrode 2 was positive). Comparison of the absorbance was made between before the voltage application and after a lapse of 200 ms since the voltage application. When, through the application, no change was observed, or the absorbance at 595 nm increased, the voltage was increased in units of 0.1 V.

(ii) When the amount of change in absorbance at 595 nm from the initial decolored state was 0.005 or less, the voltage application ended.

(iii) When the amount of change in absorbance at 460 nm from the initial decolored state was 0.005 or more, the voltage application ended.

The result was that the voltage application ended after about three minutes from the start of the drive in accordance with Item (ii) above, and it was confirmed that the insufficient decoloring in which the colored form of the cathodic EC material remained was reduced to 1/12 or less. Further, through visual observation of the EC element after the processing, it was confirmed that the insufficient decoloring was uniformly reduced and was almost no longer visible.

From those examples, the following effects were confirmed.

(1) Through use of the third electrode of a porous metal oxide that has a larger effective area than those of the first electrode and the second electrode and that has a nanometer-scale fine structure, a colored form that remains due to charge imbalance in the EC element can be effectively reduced.

(2) Through arrangement of the third electrode so as to surround the first electrode or the second electrode, the insufficient decoloring can be uniformly reduced.

(3) Even in an element in which an EC material is fixed to an electrode, through use of the third electrode, a colored form that remains due to charge imbalance in the EC element can be effectively reduced.

(4) Through use of the third electrode in the EC element in which the structure configured to reduce substance transport is arranged between the third electrode and the first electrode and between the third electrode and the second electrode, a colored form that remains due to charge imbalance in the EC element can be effectively reduced.

(5) Through control of a potential difference between the third electrode and the first electrode or the second electrode depending on a detected charge balance state of the EC element, a colored form that remains due to charge imbalance in the EC element can be effectively reduced.

(6) Through use of the driving method in which a voltage to be applied between the third electrode and the first electrode or the second electrode is controlled depending on a detected charge balance state of the EC element, a colored form that remains due to charge imbalance in the EC element can be effectively reduced.

EXAMPLE 3

1. Production of Element

Figure 11A:
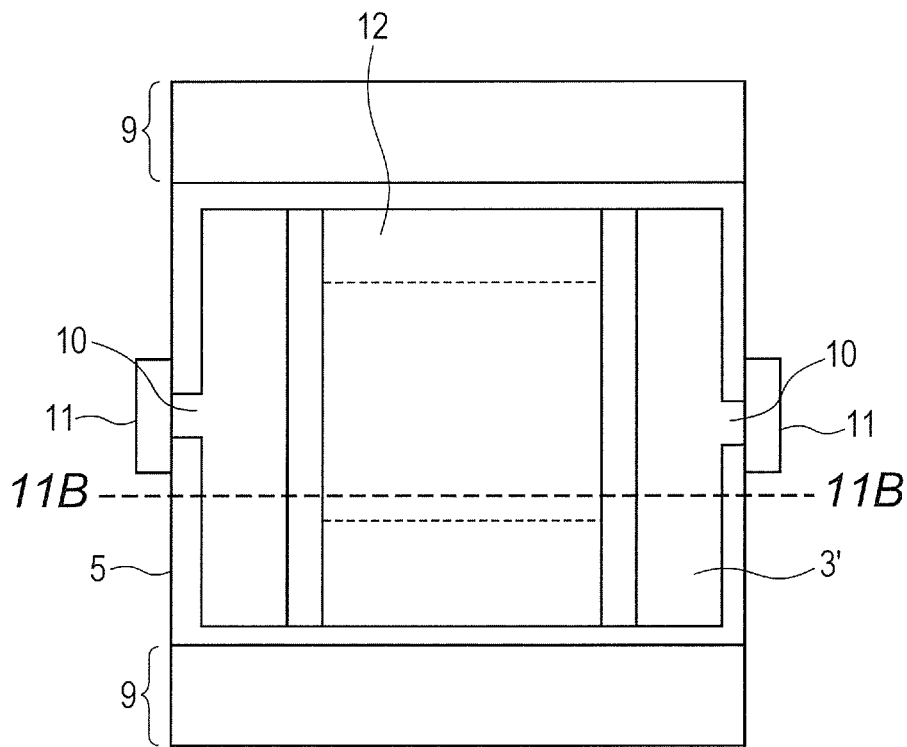
FIG. 11A is a schematic top view for illustrating an EC element of Example 3.
Figure 11B:
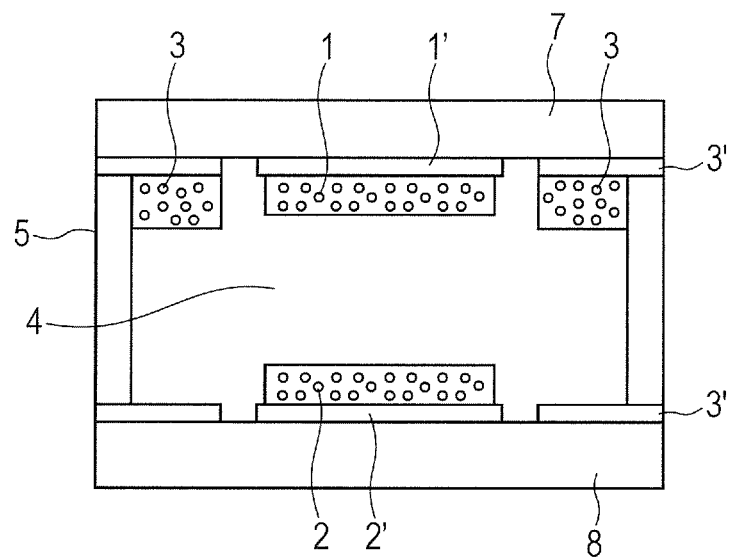
FIG. 11B is a sectional view taken along the line 11B-11B of FIG. 11A.

An element illustrated in FIG. 11A and FIG. 11B was manufactured. FIG. 11A is a schematic top view of the EC element, and FIG. 11B is a schematic sectional view of the EC element taken along the line 11B-11B of FIG. 11A.

[Preparation of Electrode and Substrate]

Two transparent conductive glass sheets were prepared in the same manner as in Example 1. A part of a FTO film of one of the transparent conductive glass sheets was removed using a diamond tool, and a first electrode formation region 1' was formed in the middle and the third electrode formation region 3' electrically isolated from the first electrode formation region 1' was formed at each end. Further, a part of a FTO film of the other of the transparent conductive glass sheets was removed using the diamond tool, and the second electrode formation region 2' was formed in the middle and the third electrode 3 electrically isolated from the second electrode formation region 2' was formed at each end.

[Production of First Electrode 1 and Third Electrode 3]

A titanium oxide nanopaste (Nanoxide-HT, manufactured by Solaronix SA) was applied to the first electrode formation region 1' and the third electrode formation regions 3', and was calcinated under the conditions of 500° C. and 30 minutes to form the third electrodes 3 formed of porous titanium oxide. A 5 mM aqueous solution of Compound 2 serving as the cathodic EC material was applied to the first electrode formation region 1' after the calcination, and the electrode formation region 1' was settled overnight, was washed with water, and was dried to form the first electrode 1 to which the cathodic EC material had been fixed.

[Production of Second Electrode 2]

A tin oxide nanoparticle slurry (manufactured by CIK Nanotec Ltd.) having an average particle diameter of 21 nm, and a zinc oxide nanoparticle slurry (manufactured by CIK Nanotec Ltd.) having an average particle diameter of 34 nm were mixed such that the volume ratio of tin oxide:zinc oxide was 2:1. In addition, a small amount of an inorganic binder was added thereto in order to improve flatness of the film surface and to prevent peeling, to thereby provide a nanoparticle-mixed slurry. The mixed slurry was applied to the third electrode formation regions 3', and was calcinated under the conditions of 500° C. and 30 minutes, and then only zinc oxide was etched with dilute hydrochloric acid. The electrode was soaked in a 20 mM chloroform solution of Compound 3 overnight and was cleaned to form the second electrode 2.

[Bonding of Substrate]

An UV-curable adhesive serving as the seal material 5 that was the same as the one used in Example 1 and that did not contain beads therein was applied to a periphery of the transparent conductive glass sheet having the second electrode 2 formed thereon except for the electrode extraction regions 9 and the inlets 10. The other transparent conductive glass sheet was put on top of the transparent conductive glass sheet so that the first electrode 1 and the second electrode 2 were opposed to each other and so that the third electrodes 3 were opposed to each other, and UV was radiated to cure the adhesive.

[Injection of Solution and Arrangement of Unit Configured to Detect Charge Balance State]

As an electrolyte solution, a propylene carbonate solution of 0.1 M lithium perchlorate was used. The solution was injected through the inlets 10 and sealed (11) with the UV-curable adhesive described above to manufacture the EC element. Then, using a method similar to that in Example 1, a unit configured to detect a charge balance state including an LED having a light emission wavelength of 520 nm and an LED having a light emission wavelength of 595 nm was arranged.

2. Endurance Drive of EC Element

After a cycle test for three days in which a rectangular wave of 1.2 V for 15 seconds and 0 V for 15 seconds was applied between the first electrode 1 and the second electrode 2 of the EC element, the first electrode 1 and the second electrode 2 were short-circuited so that the EC element was decolored. At this time, the amounts of change in absorbance from the initial decolored state at 520 nm and at 595 nm were +0.002 and +0.052, respectively. It was confirmed that insufficient decoloring occurred in which the colored form of the cathodic EC material having an absorption peak at 605 nm remained.

3. Reduction of Insufficient Decoloring

The short-circuit between the first electrode 1 and the second electrode 2 of the EC element was released, and a voltage was applied between the first electrode 1 and the third electrode 3. The application time was 100 ms. The operation was in the following sequence.

(i) The applied voltage was started at 0.1 V (the third electrode 3 was negative and the first electrode 1 was positive). Comparison of the absorbance was made between before the voltage application and after a lapse of 200 ms since the voltage application. When, through the application, no change was observed, or the absorbance at 595 nm increased, the voltage was increased in units of 0.1 V.

(ii) When the amount of change in absorbance at 595 nm from the initial decolored state was 0.005 or less, the voltage application ended.

(iii) When the amount of change in absorbance at 460 nm from the initial decolored state was 0.005 or more, the voltage application ended.

The result was that the voltage application ended after about five minutes from the start of the drive in accordance with Item (ii) above, and it was confirmed that the insufficient decoloring in which the colored form of the cathodic EC material remained was reduced to 1/10 or less. Further, through visual observation of the EC element after the processing, it was confirmed that the insufficient decoloring was uniformly reduced and was almost no longer visible.

From those examples, the following effects were confirmed.

(1) Through control of a potential difference between the third electrode and the first electrode depending on the detected charge balance state of the EC element, a colored form that remains due to charge imbalance in the EC element can be effectively reduced.

(2) Through determination of whether or not additional voltage application is necessary depending on the further detected charge balance state of the EC element after the voltage application in the voltage control step, a colored form that remains due to charge imbalance in the EC element can be effectively reduced.

According to the present invention, an organic EC element that is configured to suppress change in optical characteristics as time progresses, and is particularly excellent in resisting change in characteristics when decolored can be provided. Further, according to the present invention, insufficient decoloring due to charge imbalance can be eliminated without being accompanied by increased power consumption and by reduced response speed, and the EC element is excellent in reproducing a spectrum after the insufficient decoloring is eliminated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-112778, filed Jun. 3, 2015, and Japanese Patent Application No. 2016-104873, filed May 26, 2016, which are hereby incorporated by reference herein in their entirety.

What is claimed is:

1. An electrochromic element, comprising:
a first electrode and a second electrode, at least one of the first electrode and the second electrode being transparent;
a third electrode; and
an electrolyte, an anodic organic electrochromic material, and a cathodic organic electrochromic material that are arranged between the first electrode and the second electrode,
wherein the third electrode is electrically connectable to at least one of the first electrode and the second electrode via the electrolyte, and
wherein the third electrode has an effective area that is larger than an effective area of the first electrode and an effective area of the second electrode.

2. The electrochromic element according to claim 1, wherein the third electrode is arranged out of an optical path of light that passes through at least one of the first electrode and the second electrode.

3. The electrochromic element according to claim 1, wherein the third electrode is arranged at least part of a periphery of one of the first electrode and the second electrode.

4. The electrochromic element according to claim 1, wherein the third electrode comprises a porous electrode having a nanometer-scale fine structure.

5. The electrochromic element according to claim 1, wherein the third electrode comprises a metal oxide.

6. The electrochromic element according to claim 1, wherein at least one of the anodic organic electrochromic material and the cathodic organic electrochromic material is fixed to one of the first electrode and the second electrode.

7. The electrochromic element according to claim 1, further comprising a structure arranged between the third electrode and one of the first electrode and the second electrode, and configured to reduce substance transport.

8. The electrochromic element according to claim 1, further comprising a unit configured to detect a charge balance state of the electrochromic element.

9. The electrochromic element according to claim 8, wherein the unit configured to detect a charge balance state comprises a unit configured to detect a charge balance state using light absorption of at least one of the anodic organic electrochromic material and the cathodic organic electrochromic material.

10. An optical filter, comprising the electrochromic element of claim 1.

11. An image pickup apparatus, comprising:
the optical filter of claim 10; and
a light-receiving element configured to receive light that has passed through the optical filter.

12. A lens unit, comprising:
the optical filter of claim 10; and
an optical system including a plurality of lenses.

13. A window, comprising the electrochromic element of claim 1.

14. A method of driving an electrochromic element,
the electrochromic element comprising:
a first electrode and a second electrode, at least one of the first electrode and the second electrode being transparent;
a third electrode; and
an electrolyte, an anodic organic electrochromic material, and a cathodic organic electrochromic material that are arranged between the first electrode and the second electrode,
the method comprising:
controlling a voltage to be applied between at least one of the first electrode and the second electrode and the third electrode depending on a detected charge balance state of the electrochromic element.

15. The method of driving an electrochromic element according to claim 14, further comprising, after voltage application in the controlling a voltage, determining whether or not additional voltage application is necessary depending on a further detected charge balance state of the electrochromic element.

16. A method of driving an electrochromic element,
the electrochromic element comprising:
a first electrode;
a second electrode;
a third electrode; and
an electrolyte, an anodic organic electrochromic material, and a cathodic organic electrochromic material that are arranged between the first electrode and the second electrode,
the third electrode being electrically connected to at least one of the first electrode and the second electrode,
the method comprising:
controlling a voltage to be applied between at least one of the first electrode and the second electrode and the third electrode depending on a detected charge balance state of the electrochromic element.

17. The method of driving an electrochromic element according to claim 16, wherein the third electrode has an effective area that is larger than an effective area of the first electrode and an effective area of the second electrode.

* * * * *